United States Patent [19]

Bell et al.

[11] Patent Number: 5,379,438

[45] Date of Patent: Jan. 3, 1995

[54] TRANSFERRING A PROCESSING UNIT'S DATA BETWEEN SUBSTRATES IN A PARALLEL PROCESSOR

[75] Inventors: Alan G. Bell, Palo Alto; John Lamping, Los Alto, both of Calif.

[73] Assignee: Xerox Corporation, Stamford, Conn.

[21] Appl. No.: 629,732

[22] Filed: Dec. 14, 1990

[51] Int. Cl.$^6$ ............................................. G06F 15/16
[52] U.S. Cl. .................... 395/800; 395/325; 395/650
[58] Field of Search ......................... 395/800, 325, 650

[56] References Cited

U.S. PATENT DOCUMENTS

| | | | |
|---|---|---|---|
| 4,633,387 | 12/1986 | Hartung et al. | 395/650 |
| 4,748,558 | 5/1988 | Hirosawa et al. | 395/650 |
| 4,794,516 | 12/1988 | Auerbach et al. | 395/325 |
| 4,805,091 | 2/1989 | Thiel et al. | 395/800 |
| 4,814,973 | 3/1989 | Hillis | 395/800 |
| 4,827,403 | 5/1989 | Steele, Jr. et al. | 395/800 |
| 4,949,243 | 8/1990 | Mohamed et al. | 395/325 |
| 4,954,945 | 9/1990 | Inoue | 395/650 |
| 5,010,477 | 4/1991 | Omoda et al. | 395/800 |
| 5,053,950 | 10/1991 | Naganuma et al. | 395/650 |
| 5,088,048 | 2/1992 | Dixon et al. | 395/11 |
| 5,123,109 | 6/1992 | Hillis | 395/800 |
| 5,146,540 | 9/1992 | Natarajan | 395/11 |
| 5,146,606 | 9/1992 | Grondalski | 395/800 |
| 5,146,608 | 9/1992 | Hillis | 395/800 |
| 5,325,500 | 6/1994 | Bell et al. | 395/425 |

OTHER PUBLICATIONS

Dixon, M. Massively Parallel Assumption-based Truth Maintenance. Proceedings AAAI-88, Seventh National Conference on Artificial Intelligence; 1988 Aug. 21-26; St. Paul, Minn.: AAAI; 1988; pp. 199-204.

Types SN54157, SN54148, SN54LS147, SN54LS148, SN74147, SN74148 (TIM9907), SN74LS147, SN74LS148, 10-line-to-line and 8-line-to-3-line Priority Encoders, The TTL Data Book for Design Engineers, Second Ed., Texas Instruments, 1981, pp. 7-151 through 7-156.

Ke, G. Y., Li, D. X., Guo, F. J., Xing, W. D., and Min, Z. W., "Design Considerations of a Distributed Parallel Reduction Architecture," IEEE Second International Conference on Computers and Applications, Jun. 1987, Peking, China, pp. 809-816.

Miyagi et al., "GaAs Mutichip Module . . . " Mag-90, IEEE Technology Conference pp. 580-585 vol. 1.

Wang, "Message Routing Algorithms . . . " Apr. 1990, IEEE Compt. pp. 276-281.

Willebeek-LeMair et al., "A Localized Dynamic . . . " Oct. 1990 I.E.E.E, pp. 380-383.

Lin-Hendel et al., "The design of a . . . " Oct. 1989, IEEE Compt. pp. 224-228.

Primary Examiner—Parshotam S. Lall
Assistant Examiner—Viet Vu

[57] ABSTRACT

A processor includes interconnected substrates, each with external connecting circuitry and parallel processing circuitry that can perform value assignment search for a set of variables. The parallel processing circuitry includes processing units, each with memory and processing circuitry, and transfer decision logic for determining whether to transfer the data of any of the processing units to another substrate. Each substrate has count logic for counting the processing units whose data indicates a combination of values that could be consistent with constraints being applied, each of which has a valid bit indicating that it could be consistent. The counts are transferred to each connected substrate, and the transfer decision logic at each substrate determines, for each connected substrate, whether to transmit data, receive data, or neither transmit nor receive. The transfer decision logic decides to transfer data only if there are sufficient valid processing units on one substrate and sufficient invalid processing units on the other substrate to ensure that the transfer will succeed. Balancing is performed frequently enough that all substrates have approximately equal numbers of valid processing units. Processing unit selection logic on each substrate selects processing units as sources or destinations, and the select logic can also provide an OR signal. Each pair of connected substrates has a single serial channel, so that one connected substrate transmits its count first, then the other. The same serial channels are used to obtain an intersubstrate count of processing units by assigning each substrate a level in a hierarchy at which it receives sums from some of its connected substrates, operates its own summing logic to add them to its own count, and transmits the resulting sum to another of its connected substrates.

11 Claims, 23 Drawing Sheets

TRANSFERRING A PROCESSING UNIT'S DATA BETWEEN SUBSTRATES IN A PARALLEL PROCESSOR

BACKGROUND OF THE INVENTION

The present invention relates to integrated circuitry that can perform operations in parallel.

Hillis, U.S. Pat. No. 4,814,973, describes a parallel processor array that includes more than a million processor/memories interconnected in an n-dimensional pattern. The means for interconnecting the processor/memories includes means for generating an addressed message packet that is routed from one processor/memory to another in accordance with address information in the message packet. The interconnecting means also includes a synchronized routing circuit at each node for routing the message packets. As shown and described in relation to FIG. 1A, the array is connected in a two-dimensional grid pattern, which is useful for writing large amounts of data into the array, as at the beginning of a computation, and for reading out the array's contents when processing is interrupted. But for rapid interchange of data in random directions between processor/memories during computation, the integrated circuits (ICs), each containing 32 identical processor/memories, are also interconnected in a Boolean n-cube of fifteen dimensions, as described in relation to Tables I and II and as illustrated in FIGS. 2 and 3. Each IC is connected to its fifteen nearest neighbors by input lines and output lines, and each IC is provided with logic circuitry to control routing of messages, as described in relation FIGS. 6B and 8–16. Within each IC, bus connections are provided to the processor/memories so that every one of the more than one million processor memories can send a message to every other.

SUMMARY OF THE INVENTION

The present invention provides circuitry on a substrate that can be connected to other components, such as to other similar substrates. The circuitry on the substrate includes parallel processing circuitry with a number of processing units, each able to store and perform operations on respective data. In addition, the circuitry on the substrate includes an external connection and external transfer means For transferring data between any of the processing units and the external connection. The external transfer means can include transfer decision logic for determining whether to transfer the respective data of a processing unit off the substrate. The external connections on a number of substrates can be interconnected to form a coprocessor that can be used in performing value assignment search for a set of variables, with each processing unit's respective data indicating a respective combination of values that could be assigned to the variables.

One aspect of the invention results from the observation of interrelated problems that arise in some types of parallel processing. Some parallel processing operations require a progressively increasing number of processing units. For example, computational problems that can be divided into a large number of independent problems, each of which requires a relatively small amount of data, often start with a small number of processing units and require progressively more processing units as computation proceeds. An important example of such a problem is searching for a consistent assignment of values to a set of variables, a process referred to herein as value assignment search. Copending, coassigned U.S. patent application Ser. No. 07/205,125, now issued as U.S. Pat. No. 5,088,048 entitled "Massively Parallel Assumption-based Truth Maintenance" and incorporated herein by reference ("the Massively Parallel ATMS application") describes value assignment search operations that can begin with one active processing unit and, through a forking operation, can increase the number of processing units as the search progresses. Such an operation cannot be performed in parallel, however, if the number of processing units requited exceeds the number available.

Many common and interesting problems can be formulated as value assignment searches, including bin packing, propositional satisfiability, map coloring, many forms of parsing, and many other NP-complete problems. These problems can be defined in terms of a set of variables, also called assumption variables, and a set of rules. Each variable has a finite number of possible values. Each rule determines, based on an assignment of values to a subset of the variables, either the values of other variables or that the assignment of values is inconsistent. For example, in a sentence parsing problem, the variables correspond to ways of parsing fragments of the sentence and the rules ensure that the parse is consistent. Such a problem is solved by finding a complete assignment of values to variables that is consistent with the rules.

Since value assignment search problems are NP-complete, no known algorithm or machine can perform an arbitrarily large value assignment search in polynomial time. On the other hand, serial algorithms such as backtracking and constraint analysis can perform some such searches.

Furthermore, as described in the Massively Parallel ATMS application, an assumption-based truth maintenance system (ATMS), which can perform value assignment searches, can be implemented on a highly parallel processor such as the Connection Machine of Thinking Machines Corporation to reduce execution time by orders of magnitude over serial algorithms.

A highly parallel processor, such as the Connection Machine, can perform a value assignment search by handling a number of independent combinations of values in parallel, as described in the Massively Parallel ATMS application. Each combination of values can be handled independently by a respective processing unit, so that the processing units can perform value assignment operations in parallel. This technique reduces the computational cost of many value assignment searches, making such searches feasible where they were not feasible with serial algorithms.

Nonetheless, conventional highly parallel processors such as the Connection Machine do not include enough processing units to handle value assignment searches of moderate complexity without some serialization of processing. This is because moderately complex value assignment searches must consider a very large number of combinations of values.

This problem can be alleviated by increasing the number of processing units available in a processor. Copending, coassigned U.S. patent application Ser. No. 07/628,916, now issued as U.S. Pat. No. 5,325,500, entitled "Parallel Processing Units on a Substrate, Each Including a Column of Memory" and incorporated herein by reference ("the column processing application"), describes techniques that provide high processing unit density on a substrate. But even with such techniques, the number of processing units on a substrate may not be adequate for a moderately complex value assignment search.

One aspect of the invention is based on the recognition that value assignment search and similar types of computation can be performed in parallel by a processor that includes more than one substrate, each with a large number of processing units, if the data of a processing unit can be transferred between substrates when necessary. For example, the number of active processing units on one substrate can be reduced when necessary by transferring an active processing unit's data to an inactive processing unit on a connected substrate.

This solution can be implemented by connecting substrates, each of which has external transfer means for transferring data between any of its processing units and its external connecting circuitry for transfer to a connected substrate. In value assignment search, each active processing unit's data indicates a combination of values of a set of variables, and the processing units operate in parallel to determine whether their respective combinations of values are consistent with constraints. As a result of these operations, some active processing units become inactive due to inconsistency, and some inactive processing units become active to handle new subcombinations of values, so that the distribution of active processing units on the substrates becomes imbalanced. But the external transfer means of one substrate can transfer an active processing unit's data to another substrate, restoring balance.

A processor according to this aspect of the invention can, for example, serve as a coprocessor performing value assignment search in response to a host system. The processor can include a central controller that sends commands to the substrates to control transfers of data and other operations.

Several related aspects of the invention are based on the observation of practical problems in constructing a processor that includes interconnected substrates between which a processing unit's data can be transferred.

If a large number of substrates are interconnected, it is desirable that all the substrates be identical, both to realize economies of fabrication and to ensure that any substrate can replace any other. Therefore, substrates for use in value assignment search or similar computations should be interconnectable into a processor with a large number of identical substrates.

It is also desirable to be able to arbitrarily interconnect the substrates to form any topology of interconnection in which each substrate is connected directly to a set of connected substrates and indirectly to all other substrates. The topology can be selected because it performs balancing more efficiently. For a large number of substrates, a topology such as a perfect shuffle network may be chosen in which no substrate is separated from any other substrate by more than a small number of connections. For a smaller number of substrates, a simpler topology such as a two-dimensional grid may be chosen without incurring too many steps between substrates. Other topologies include a mesh, a torus, and so forth. Furthermore, if a processor includes a number of printed circuit boards, each with a large number of substrates, the topology may reflect the multiple packaging hierarchies. Therefore, substrates for use in value assignment search or similar computations should be arbitrarily interconnectable into any desired topology.

Some of these related aspects are based on the observation of a tension between centralized operations and the use of arbitrarily interconnected identical substrates. For example, if the central controller must make detailed decisions about transferring data from one substrate to another, the central controller will need a large amount of information from each substrate, suggesting extensive connections between each substrate and the central controller. Such connections would limit flexibility in interconnecting the substrates.

One of these aspects is based on the discovery that decisions about whether to transfer data need not be made centrally, but can be made locally, alleviating this problem. The external transfer means of a substrate can include transfer decision logic for determining whether to transfer the respective data of any of the processing units off the substrate.

A substrate's transfer decision logic could apply any of a variety of criteria. For example, the transfer decision logic could compare the number of processing units actively performing operations with a stored value indicating a maximum number of active processing units. Or the transfer decision logic could compare the number of inactive processing units with a number of processing units needed to receive respective data from active processing units.

A closely related aspect of the invention results from the observation that the criterion applied by a substrate's transfer decision logic should depend on the state of substrates to which it is connected. In other words, the transfer decision logic of connected substrates must make coordinated determinations. One substrate's transfer decision logic cannot determine by itself whether data should be transferred. Transferring data the wrong way between substrates may increase the amount of imbalance.

This problem can be solved if two connected substrates exchange data indicating the number of active processing units on each substrate. The respective transfer decision logic on each substrate can then compare the numbers to determine whether to transfer the respective data of an active processing unit on either substrate to an inactive processing unit on the other substrate. If the difference between the numbers exceeds an appropriate maximum tolerable difference, a transfer can then be made.

This solution can be implemented with count logic on each substrate for obtaining count data indicating the number of active processing units on the substrate. Each substrate's external transfer means can include transmit/receive logic which transmits the substrate's count data and receives count data from each of its connected substrates. The transfer decision logic can include, for each connected substrate, a transfer decision logic unit for comparing its count with the local count to determine whether to transfer data.

The transfer decision logic can also apply a threshold criterion in determining whether to transfer data. The threshold criterion can be related to the number of interconnections such that the count data meets the criterion only if a processing unit's data can be successfully transferred. For example, if each substrate is connected to M other substrates, it is possible that transfers to all of those other substrates will occur during a given balancing operation. Therefore, a transfer should not be made from a substrate unless its count is at least M, to ensure that the substrate has sufficient active processing units for the transfer. Similarly, a transfer should not be made to a substrate unless its count is at least M less than its total number of processing units, to ensure that it has sufficient inactive processing units for the transfer.

Another related aspect is based on the above-noted observation of tension between centralized operations and arbitrarily interconnected identical substrates. After transfer decision logic decides to transfer a processing unit's data between substrates, the processing units that are the source and destination of the transfer must be found. Problems with interconnection arise if the central controller must select the source and destination of each transfer.

This problem can be solved by providing, on each substrate, processing unit selection logic for selecting one of the processing units based on locally available data, so that the central controller need not select the source and destination of a transfer. The selection can be based on data from each processing unit indicating whether it is eligible for selection. The processing unit selection logic on one substrate can select one of its active processing units as the source of a transfer and the processing unit selection logic on a connected substrate can select one of its inactive processing units as the destination.

The processing unit selection logic can, for example, be implemented with conventional find-first-one techniques. Furthermore, an additional output OR line can indicate whether any of the processing units provided data indicating eligibility for selection. An OR operation can be performed on the OR lines from all the substrates to provide an intersubstrate OR signal to the central controller indicating whether at least one processing unit in the processor provided data indicating eligibility.

A closely related aspect of the invention is based on the observation that value assignment search and similar operations begin with a single active processing unit. In value assignment search, the initial active processing unit handles the first combination of values, in which none of the variables has been assigned a value. An initial active processing unit must somehow be selected, which means that one of the substrates must be selected to be a first substrate. But the substrates should all be fabricated identically.

This problem can be solved by connecting a first substrate directly to the central controller such that data can be transferred between the first substrate and the central controller as if the central controller were a connected substrate. As a result, the first substrate requires no circuitry or programming to make it different than other substrates. For example, data for the initial active processing unit can be transferred to the first substrate in much the same way that data is transferred during balancing. The processing unit selection logic on the first substrate can then be used to select one of its processing units as the initial active processing unit.

Another aspect of the invention is based on the observation that it is important to limit the number of I/O pads or other external connections on each substrate. One way to reduce the number of external connections is to reduce the number of substrates to which each substrate is connected, but this approach limits flexibility in choosing a topology. It is desirable for each substrate to be connected to at least three other substrates so that the maximum distance between substrates can be directly proportional to the logarithm of the number of substrates rather than to the number of substrates. Furthermore, so,he topologies of interconnection may require a certain number of connections; the perfect shuffle network, for example, requires four connections to each substrate.

This aspect is further based on the discovery that this problem can be alleviated by connecting each pair of connected substrates with a single bidirectional serial channel and by providing, on each substrate, control signal logic for providing control signals to control the transfer of data on the serial channels. The control signal logic on connected substrates can determine the sequence in which data is transferred between the substrates, avoiding collisions.

A closely related aspect of the invention is based on the observation of several problems in transferring data between connected substrates. If two substrates are connected by a single bidirectional serial channel as described above, the control signal logic must be able to determine the sequence in which data is transferred during a bidirectional transfer of data. In other situations, some of the connections between substrates must be treated differently than other connections. For example, if a substrate is defective, its connected substrates should be able to ignore it. Also, in order to aggregate data through a hierarchy of substrates such as a tree, the substrates must be able to identify the connections that form the hierarchy and treat them differently than other connections. Hierarchical aggregation of data is especially useful in value assignment search because it can be used to obtain a sum of active processing units within a processor, which is useful in making forking decisions.

All of these problems can be solved by techniques in which the control signal logic has data that can be used to determine how a transfer should be made. The data used depends on the type of transfer being made.

For bidirectional transfer of data on a serial channel, such as exchange of count data to be used in balancing, it is necessary that one of each pair of connected substrates transmit first and that the other transmit second, whether the transmission is of a bit or of a string of bits. Although each substrate's control signal logic could have data indicating whether it transmits first or second on each serial channel, this data could only be obtained through a centralized operation based on the specific interconnections between substrates. A substrate's control signal logic can solve this problem by treating two sets of external connections differently, with the first set always transmitting first and the second set always transmitting second. Every interconnection can then be made with a serial channel between an external connection from the first set of one substrate and an external connection from the second set of another substrate, so that collisions cannot occur. The two sets can be equal in number, so that the total number of external connections is an even number such as four or six.

Although the two set solution to the bidirectional collision problem can be implemented in hardware, it is still necessary for the control signal logic to be able to ignore an external connection that is not being used or that is connected to a defective or disabled substrate. This problem can be solved by operating each substrate to diagnose itself, then transmit data on each serial channel indicating the result of its diagnosis, so that each substrate can decide whether each of its serial channels is connected to a working substrate. The control signal logic can then store disable data for each channel indicating whether the channel can be used.

For unidirectional transfer of data that depends on current conditions, such as transfer of a processing unit's respective data, a substrate's control signal logic can obtain transfer direction data for each serial channel whose disable data indicates it can be used. The transfer direction data can indicate whether the substrate should transmit, receive, or neither through the serial channel. The transfer direction data can be provided by the transfer decision logic based on its comparison of counts.

For hierarchical transfer of data, such as the transfer of sum data in an intersubstrate count operation, a tree topology can be superimposed on the substrate interconnections by transferring data only along a set of serial channels that form the tree. A substrate's control signal logic can do this by storing hierarchical data indicating its level in the hierarchy, the external connections to substrates below it in the tree from which it receives data during hierarchical transfer, and the external connection above it in the tree to which it transmits data during hierarchical transfer. The hierarchical data can be stored in a form that can be directly provided to multiplexing logic. The circuitry on the substrate can also include intersubstrate adding circuitry for receiving data indicating respective sums of substrates at the next lower level in the hierarchy and adding the indicated sums to the local count to obtain sum data indicating the substrate's respective sum. The intersubstrate adding circuitry can be a bit serial carrysave adder, with the level in the hierarchy indicating when the substrate's local count should be input to the bit serial carrysave adder.

Another closely related aspect of the invention is based on the discovery that the topology in which substrates are interconnected is not as important to the efficiency of balancing as is the timing of balancing operations. If balancing is not performed until after one or more forking operations have multiplied the imbalance between substrates, more balancing operations are required to correct the imbalance. Due to the limited bandwidth between substrates and due to the local nature of balancing decisions, it may be necessary for other operations to wait while a series of balancing operations are performed to reduce the imbalance.

This aspect is further based on the discovery that this problem can be solved by performing balancing operations at appropriate times during value assignment search. One appropriate time is when balancing is necessary in order to permit a forking operation. Another appropriate time is when the number of active processing units is so low that a series of forking operations would result in a serious imbalance, which occurs at the beginning of a value assignment search and could also occur later in a value assignment search.

The following description, the drawings, and the claims further set forth these and other objects, features, and advantages of the invention.

DETAILED DESCRIPTION

A. Conceptual Framework

Figure 1:
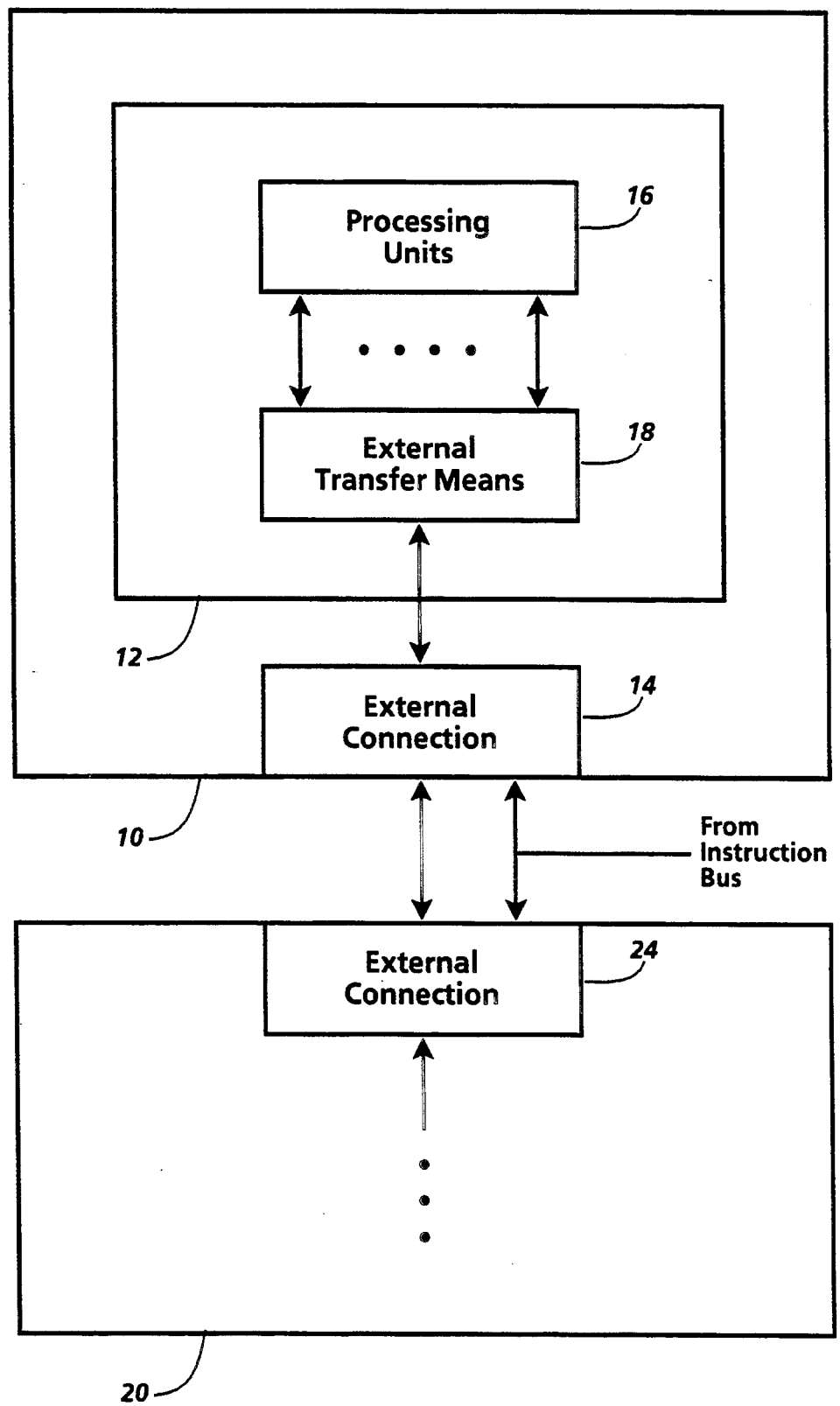
FIG. 1 is a schematic block diagram showing general components of interconnected substrates.

The following conceptual framework is helpful in understanding the broad scope of the invention, and the terms defined below have the meanings indicated throughout this application, including the claims.

"Data" refers herein to signals that indicate information. When an item of data can indicate one of a number of possible alternatives, the item of data has one of a number of "values." For example, a binary item of data has one of two values, such as "0" and "1" or "ON" and "OFF."

"Circuitry" or a "circuit" is any arrangement of matter that can respond to first data at one location or time by providing second data at another location or time. Circuitry "stores" the first data when it receives the first data at one time and, in response, provides substantially the same data at another time. Circuitry "transfers" the first data when it receives the first data at a first location and, in response, provides substantially the same data at a second location. "Logic" is circuitry that can respond to the first data by providing different data at another location or time. Logic can include circuitry that transfers and stores data. Logic that provides data to be transferred from a first location to a second location "transmits" the data, while logic at the second location "receives" the data.

A "processor" or "processing circuitry" is any combination of circuitry that can perform operations on data. A "processing unit" is a processor. A "parallel processor" is a processor that includes more than one processing unit, each able to perform operations on data in parallel with the others.

A "memory element" is any combination of circuitry that can store data. A "memory cell" is a memory element that can store a single unit of data, such as a bit or other n-ary digit or an analog value. A "register" is a memory element that includes an array of memory cells for temporary storage of data. A "shift register" is a register in which the data stored in all of the memory cells can be shifted along a dimension of the array to the next memory cell. If the array is one-dimensional, the shifting operation can receive and store a series of bits of data or it can provide a series of bits of data as output.

An operation "writes" or "sets" a memory element or memory cell by storing data in the memory element or memory cell. An operation "reads" a memory element or memory cell by producing data indicating the value of data stored in the memory element or memory cell. A memory element or memory cell is "selected" by being put into a state in which it can be read or written. A memory element or memory cell or the data it stores is "accessed" by being read or written.

An "array" of memory elements is a number of memory elements that are selected or accessed in an interdependent manner. For example, an array can have two dimensions of selection or access, with the memory elements being in sets that are arbitrarily called "row sets" or "rows" and "column sets" or "columns."

A "register" is a number of memory elements that together can store a data value.

A processor "uses" data in performing an operation when the result of the operation depends on the value of the data. An operation of a processor "transfers" data from a first memory element or memory cell to a second if the result of the operation is that the data stored in the second memory element or memory cell is the same as the data that was stored in the first memory element or memory cell prior to the operation. An operation of a processor "copies" data from a first memory element or memory cell to a second if the operation transfers the data from the first memory element or memory cell to the second and if, after the operation, the data stored in the first memory element or memory cell is the same as the data that was stored there prior to the operation.

Circuitry "decodes" data by receiving the data and by providing respective output data whose value depends on the value of the data received. In other words, there is a mapping between the value of the data received and the value of the output data that results from decoding.

A "substrate" or "chip" is a unit of material that has a surface at which circuitry can be formed or mounted. An "integrated circuit" is a circuit formed on a substrate by processes such as etching and deposition.

Any two components of circuitry are "connected" when there is a combination of circuitry that can transfer data from one of the components to the other. Two components are connected by a "serial channel" when the combination of circuitry between them can carry no more than a single serial stream of data. A serial channel is "bidirectional" when it can carry data in either direction.

A "lead" is a part of an electrical component at which the component connects electrically to other components. A "line" is a simple conductive component that extends between and connects two or more leads. A lead of an electrical component is "connected" to a lead of another electrical component when there is a conductive electrical connection between them through a combination of leads and lines. In an integrated circuit, leads of two components may also be "connected" by being Formed as a single lead that is part of both components.

When used in relation to each other, the terms "variable" and "value" have interdependent meanings: A variable can take one of a respective set of possible values. Most of the variables of interest for purposes of the present invention are variables that can take one of two binary values, such as boolean variables that can take either the value TRUE or the value FALSE. For practical purposes, such a variable has a third possible value, referred to herein as a "NULL value" or an "unassigned value," at a time when it has not yet been assigned one of its binary values.

Data indicates a "combination of values" or a "value assignment" for a set of variables by indicating, for each variable, at most one of the variable's possible values.

A "value assignment search" is a process for finding a combination of values that is consistent with a set of constraints applicable to a set of variables. A "value assignment search operation" or "value assignment operation" is an operation performed during a value assignment search.

B. General Features

Figure 2A:
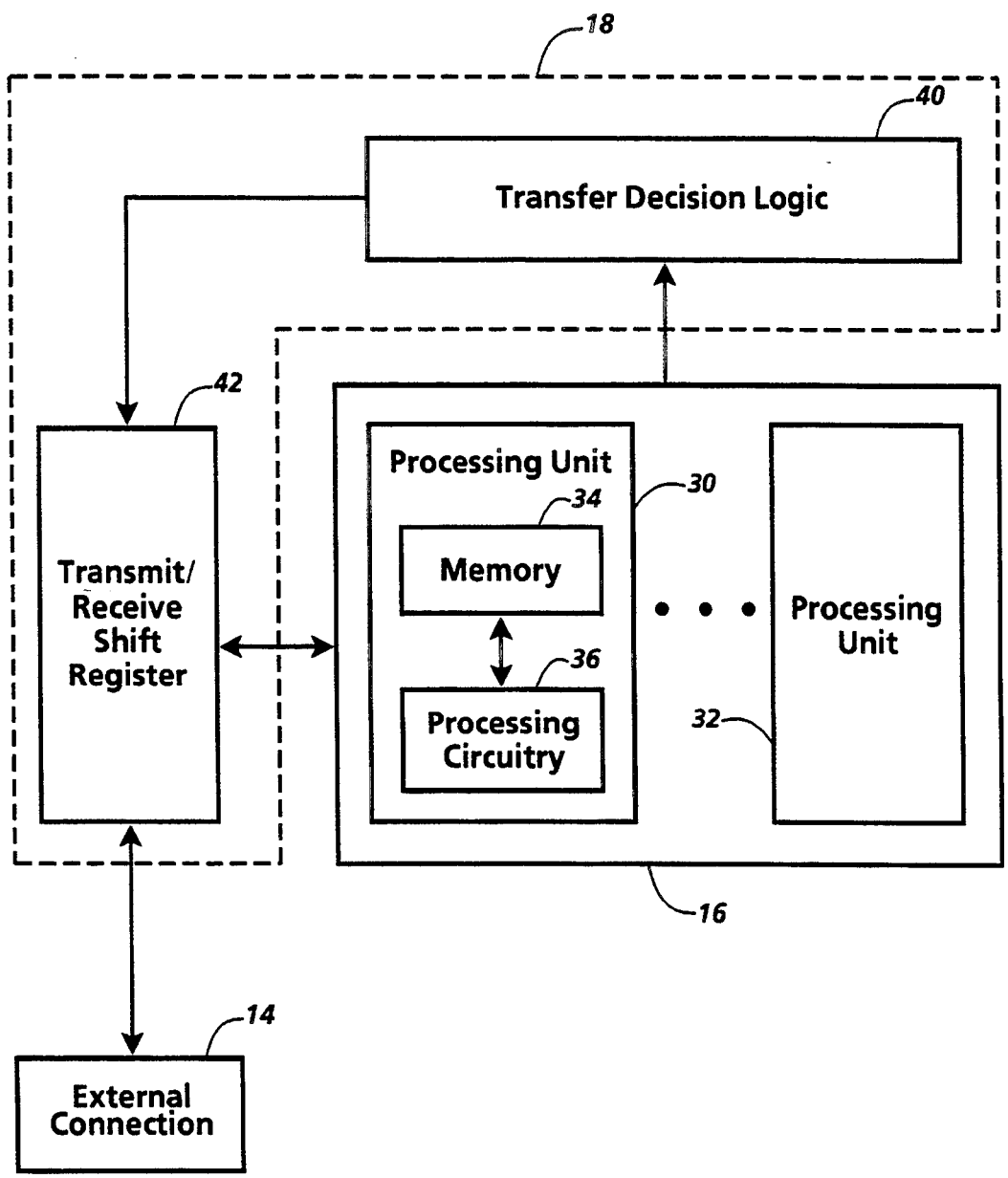
FIG. 2A is a schematic block diagram showing components on one of the substrates of FIG. 1, including a register for transferring a processing unit's data.
Figure 2B:
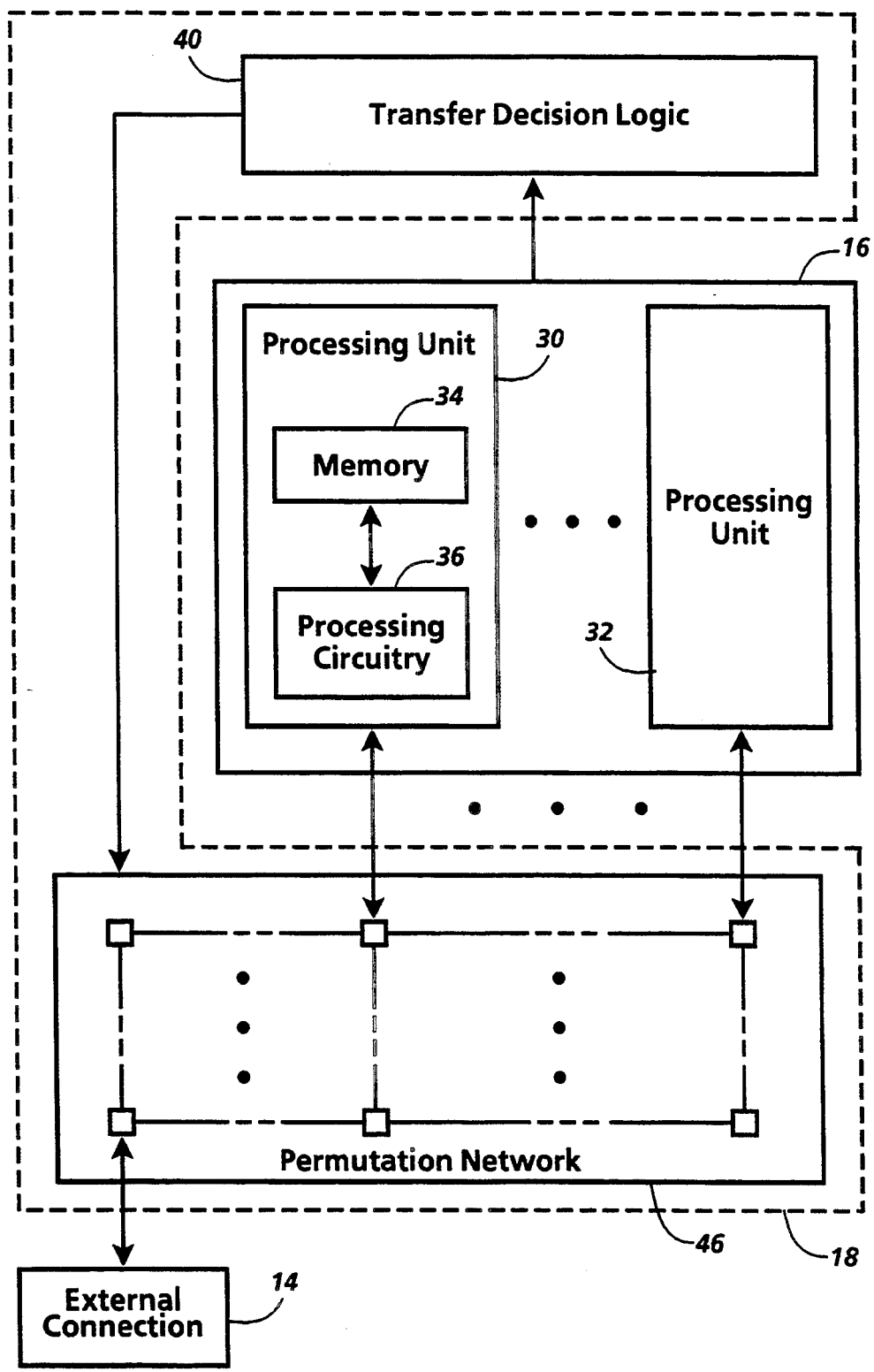
FIG. 2B is a schematic block diagram showing components on one of the substrates of FIG. 1, including a permutation network for transferring a processing unit's data.
Figure 3:
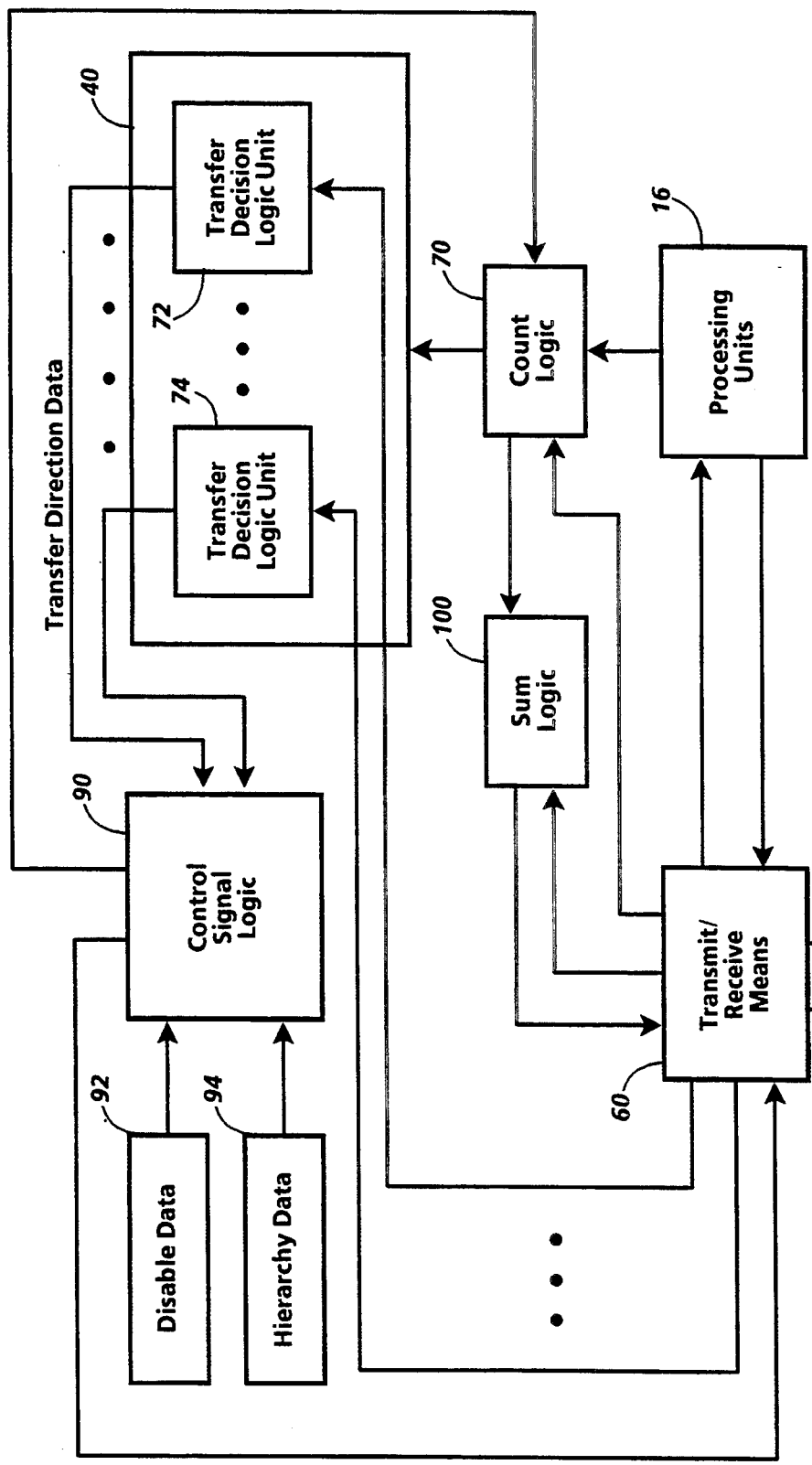
FIG. 3 is a schematic block diagram showing components of transfer decision logic in FIGS. 2A and 2B and related components.
Figure 4:
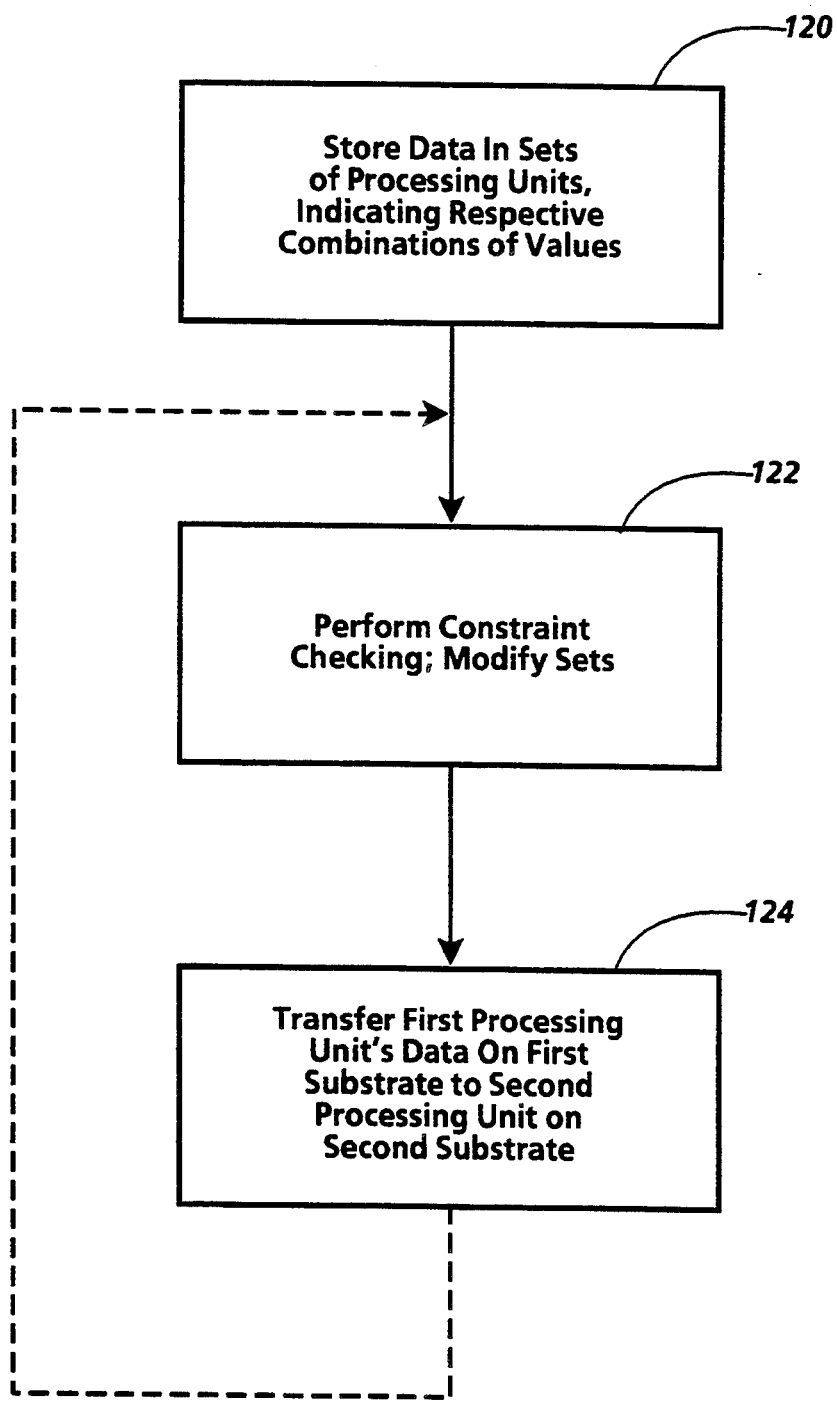
FIG. 4 is a flow chart showing general steps in value assignment search with interconnected substrates.
Figure 5:
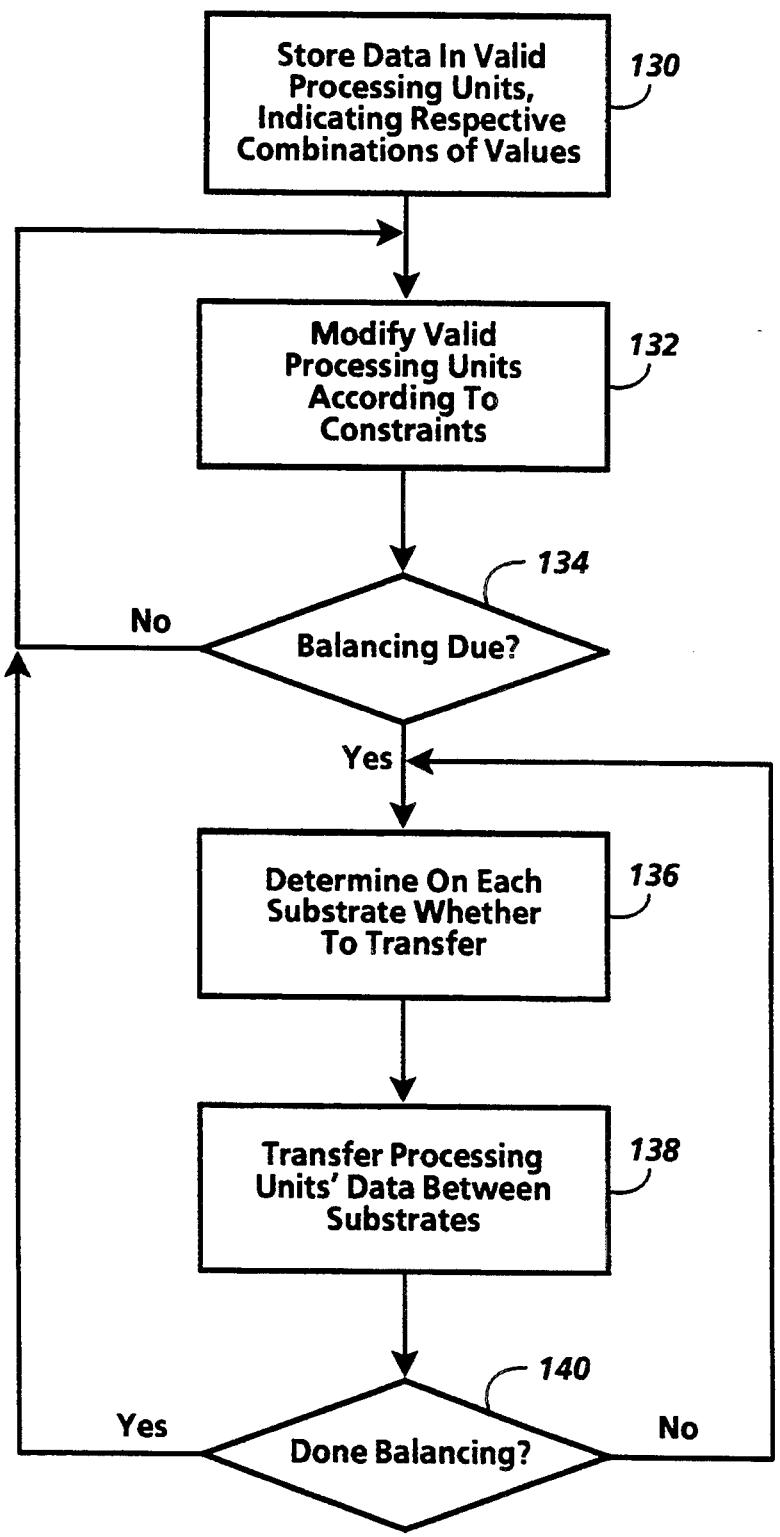
FIG. 5 is a flow chart showing general steps in value assignment search with balancing.

FIGS. 1–5 show general features of the invention. FIG. 1 shows a pair of connected substrates, each with parallel processing circuitry and external transfer means. FIG. 2A shows components within the parallel processing circuitry and external transfer means of FIG. 1, including a register for transferring data. FIG. 2B shows components within the parallel processing circuitry and external transfer means of FIG. 1, including a permutation network for transferring data. FIG. 3 shows components within the transfer decision logic in FIGS. 2A and 2B and related components. FIG. 4 shows general steps in performing value assignment search with data transfer between substrates. FIG. 5 shows steps in performing balancing during value assignment search.

FIG. 1 shows substrate 10 at the surface of which is parallel processing circuitry 12 and external connection 14. Substrate 10 can be implemented as a semiconductor substrate at the surface of which parallel processing circuitry 12 is Formed with conventional VLSI techniques. External connection 14 can be conventional I/O pads or any other means for transferring data to and from components that are not on substrate 10.

Parallel processing circuitry 12 includes processing units 16 and external transfer means 18. External transfer means 18 can transfer data between any of processing units 16 and external connection 14. Substrate 10 can also have an instruction bus or other lines for providing instructions received through external connection 14 directly to processing units 16 or to other circuitry such as a decoder.

FIG. 1 also shows substrate 20, with circuitry that can be substantially identical to the circuitry on substrate 10, with only external connection 24 being shown in FIG. 1. Because of the interconnection between substrates 10 and 20, which can be a serial channel, the respective data of a processing unit on either substrate can be transferred to a processing unit on the other substrate. For example, external transfer means 18 can transfer data from any of processing units 16 to external connection 14 for transfer to external connection 24 on substrate 20.

FIGS. 2A and 2B each show components within processing units 16 and external transfer means 18. Processing units 30 through 32 each include, as shown within processing unit 30, respective memory 34 and processing circuitry 36 connected for accessing memory 34. Memory 34 can, for example, store data indicating a respective combination of values of a set of variables for use in value assignment search. Processing circuitry 36 can perform operations on data in parallel with the processing circuitry of the other processing units. External transfer means 18 includes transfer decision logic 40 for determining whether to transfer the respective data of any of processing units 16 to external connection 14 for transfer to another component off the substrate. Such a transfer can be accomplished in response to transfer decision logic 40 by transmit/receive means for transmitting data to the other component and for receiving data from the other component.

In FIG. 2A, the transmit/receive means includes transmit/receive shift register 42 connected to processing units 16 and to external connection 14. In response to signals from transfer decision logic 40, register 42 can receive data read from any of processing units 16 and provide it as serial bits for transmission by external connection 14. Register 42 can also receive serial bits from external connection 14 and provide them for writing into any of processing units 16.

In FIG. 2B, the transmit/receive means includes permutation network 46 connected to processing units 16 and to external connection 14. In response to signals from transfer decision logic 40, permutation network 46 can be used to transfer data between any of processing units 16 and external connection 14.

FIG. 3 shows components of transfer decision logic 40 and related circuitry, including transmit/receive means 60 for transmitting and receiving data through external connection 14. Processing units 16 are connected so that the respective data of any processing unit can be transmitted by transmit/receive means 60 and so that data received by transmit/receive means 60 can be provided to any processing unit. External connection 14 can include several I/O pads that are each connected through a serial channel to another substrate, so that there is one serial channel for exchanging data with each connected substrate. In addition to circuitry as in FIG. 2A or FIG. 2B, transmit/receive means 60 can include multiplexing logic and registers or other temporary memory for data being transmitted or received. With plural transmit/receive registers or with appropriate connections to a permutation network, all of the serial channels can be used concurrently, with each being used either to transmit or receive a processing unit's data or other data used in balancing.

Count logic 70 is connected to receive data from each processing unit indicating whether it is a processing unit to be counted. Based on the data from processing units 16, count logic 70 provides count data indicating the number of processing units counted to transfer decision logic 40, which includes transfer decision logic units 72 through 74, with one transfer decision logic unit for each connected substrate. In response to control signals from control signal logic 90, count logic 70 also provides the count data to transmit/receive means 60 for transmission to all of the connected substrates.

Control signal logic 90 also provides control signals to control transmit/receive means 60 in accordance with disable data 92. Disable data 92 indicates, in relation to each I/O pad or other connecting lead in external connection 14, whether it is connected to a working substrate. If disable data 92 indicates a working connection, control signal logic 90 can control transmit/receive means 60 to transmit first or receive first on each serial channel depending on the type of its external connection. The substrate can have two types of external connections, one type through which transmit/receive means 60 can be controlled by control signal logic 90 to transmit first and then receive during a bidirectional transfer of data, and a second type through which transmit/receive means can be controlled to receive first and then transmit during a bidirectional transfer.

In response to appropriate control signals from control signal logic 90, each connected substrate transmits its respective count data in such a manner. The respective count data of the connected substrates are received by transmit/receive means 60, from which the respective count data of each connected substrate are provided to the respective transfer decision logic unit. Each transfer decision logic unit uses the count data from count logic 70 and the respective count data from the connected substrate to determine whether to transfer data from one of processing units 16 to the connected substrate. For example, if the count data from count logic 70 indicate a number of active processing units greater than the number indicated by a connected substrate's respective count data, transferring a processing unit's data tends to equalize the number of active processing units on the substrates.

Each transfer decision logic unit provides transfer direction data to control signal logic 90, indicating whether a processing unit's respective data should be transmitted to the connected substrate, received from the connected substrate, or neither transmitted nor received. Control signal logic 90 uses the transfer direction data from the transfer decision logic units in providing control signals to control transmit/receive means 60 so that data are transmitted or received according to the determinations of transfer decision logic units 72 through 74 through the working channels as indicated by disable data 92.

Count logic 70 also provides the count data to sum logic 100, which uses the count data and sum data received from one or more of the connected substrates by transmit/receive means 60 to produce sum data. The sum data produced by sum logic 100 are then transmitted by transmit/receive means 60 to another of the connected substrates. Control signal logic 90 uses stored hierarchy data 94 in controlling transmit/receive means 60 so that sum data are received from the appropriate connected substrates and are transmitted to the appropriate connected substrate according to the summing hierarchy. Hierarchy data 94 could indicate, for example, this substrate's level in a hierarchy and the connected substrates from which sum data is received at the next lower level and to which sum data is transferred at the next higher level. The sum data from the highest level of the hierarchy can be used by a central controller in controlling value assignment search operations.

FIGS. 4 and 5 show general steps in operating circuitry like that described above. FIG. 4 shows steps in intersubstrate data transfer between two substrates doing value assignment search. FIG. 5 shows steps in which the rate of balancing can be adjusted in relation to the rate of constraint checking to ensure that the number of valid processing units on interconnected substrates remains balanced.

The step in box 120 in FIG. 4 stores data in sets of processing units on first and second substrates, with the respective data of each processing unit indicating a respective combination of values of a set of variables. This step can be performed by starting with a single valid processing unit on the first substrate. Then, the step in box 122 performs constraint checking, which includes operations that modify the sets of processing units by adding and removing processing units. At the point where a first processing unit is in the set of processing units on the first substrate and a second processing unit is on the second substrate but not in its set of processing units, the step in box 124 transfers the respective data of the first processing unit to the second processing unit. This removes the first processing unit from the set on the first substrate and adds the second processing unit to the set on the second substrate.

As suggested by the clashed line in FIG. 4, the steps in boxes 122 and 124 could be repeated, though with different processing units, as part of an extended session of value assignment search. The steps in FIG. 4 can be elaborated for a more general case, as shown in FIG. 5.

The step in box 130 in FIG. 5, as in box 120 in FIG. 4, stores data in sets of valid processing units on interconnected substrates, with the respective data of each valid processing unit indicating a respective combination of values of a set of variables. This step can be performed by starting with a single valid processing unit on one of the substrates.

The step in box 132, as in box 122 performs an operation that modifies the set of valid processing units on at least one of the substrates in accordance with a set of constraints. In effect, I his step can be the smallest constraint checking step that modifies the set of valid processing units, such as a single operation that could add or remove a valid processing unit. The step in box 134 then determines whether it is time to do a balancing operation. This step could be based on the number of iterations of the step in box 132 that have been performed, on the number of added valid processing units, on the time since the last balancing operation, or any other appropriate criterion.

If balancing is due, the step in box 136 determines, on each substrate and in relation to each connected substrate, whether to transfer a processing unit's respective data to the connected substrate. For each substrate and connected substrate that determined to do a transfer in box 136, the step in box 138 performs the transfer. Then, the step in box 138 determines whether balancing has completed. This step could be based on the number of transfers performed in box 136, on the number of iterations of the step in box 136, on an actual comparison of the numbers of valid processing units on connected substrates, or any other appropriate criterion. If balancing is not completed, the step in box 136 is repeated. Otherwise, further constraint checking is performed in box 132.

By adjusting the criteria applied in boxes 134 and 140, the rate of balancing can be adjusted to control the distribution of valid processing units on the substrates. For example, the rate could be increased by performing the step in box 132 only once between balancing and by performing the steps in boxes 136 and 138 many times each time balancing is performed. Conversely, the rate could be decreased by performing the step in box 132 many times between balancing and by performing the step in box 138 only once each time balancing is performed. As discussed below, the decision about whether balancing is due in box 134 can be based on two criteria—first, whether the number of valid processing units is below a threshold, meaning that a serious imbalance could occur if balancing is not performed, and second, whether balancing is necessary in order to continue. In either case, the criterion in box 140 can be whether further iterations of the steps in boxes 136 and 138 would produce any change in the distribution of valid processing units; if not, balancing is completed.

C. Value Assignment Search

As illustrated by FIGS. 4 and 5, the invention is especially useful in performing value assignment search. The description of value assignment search in copending coassigned U.S. patent application Ser. No. 07/628,916, now issued as U.S. Pat. No. 5,325,500, entitled "Parallel Processing Units on a Substrate, Each Including a Column of Memory" and incorporated herein by reference ("the column processing application"), is helpful in understanding the implementations described below.

Figure 6:
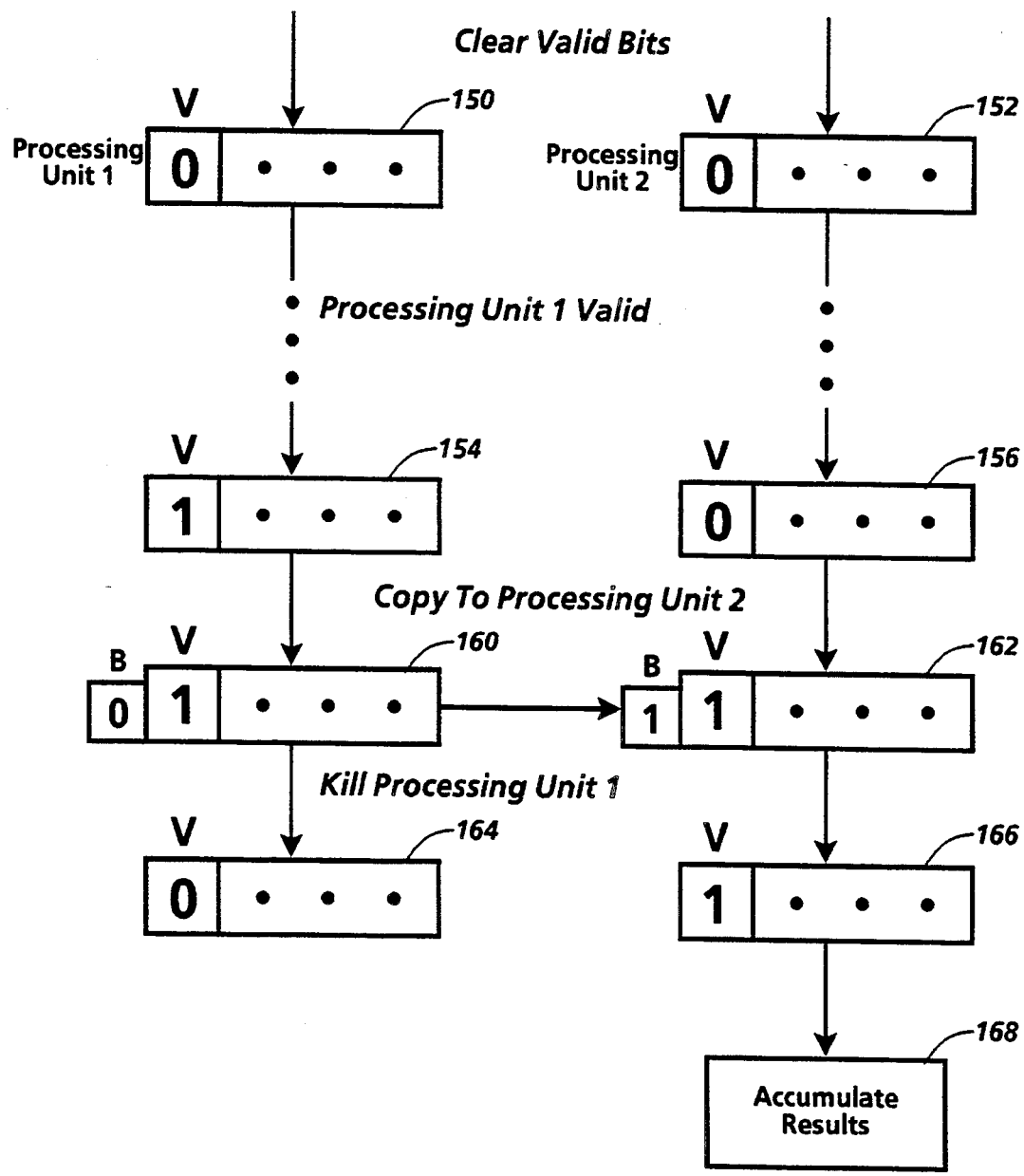
FIG. 6 is a schematic flow diagram showing stages in value assignment search including an intersubstrate transfer of data.

In addition to the description in the column processing application, FIG. 6 shows several stages in value assignment search in which a processing unit's data is transferred from one substrate to another. The left column shows the data of a first processing unit on a first substrate and the right column shows the data of a second processing unit on a second substrate.

At the first stage shown in boxes 150 and 152 in FIG. 6, both processing units have a field labeled "V" that is cleared, meaning that both processing units are invalid. For purposes of value assignment search, a "valid" processing unit can be defined as a processing unit whose combination of values could be consistent with the constraints being applied; therefore, a valid processing unit's combination of values could lead to a solution of the value assignment search problem. A processing unit that is not currently handling a combination of values or whose combination of values is inconsistent with the constraints is "invalid." Each processing unit can therefore have a single "valid bit" indicating whether it is valid or invalid as shown in FIG. 6. In order to insure that the valid bit is correct, value assignment search operations should only change the valid bit during an operation such as initialization, forking, or killing, and not during other operations. In general, invalid processing units are available to handle a combination of values.

A value assignment search begins with only one combination of variable values, typically the null combination in which all variables are unassigned. Since none of the processing units has previously been active, an initializing function can clear the valid bits of the processing units on all substrates to indicate that they are invalid, as shown in boxes 150 and 152 in FIG. 6. The initializing function can then select one substrate to be the initial substrate, can select one processing unit from the processing units on the initial substrate to be the initial valid processing unit, and can then load appropriate data into the initial valid processing unit and set its valid bit.

After initializing, a sequence of functions can be performed that make choices and check constraints. To implement the junction of making a choice between the values of a variable, all of the alternatives can be handled in parallel, with each alternative handled by a respective processing unit. Each processing unit's data indicates the respective combination of values.

Constraint checking can apply the constraints to the assigned values in parallel in order to find processing units whose respective combinations of values are inconsistent with the constraints. The function of checking constraints can be implemented by performing a logical or arithmetic operation with each processing unit's processing circuitry, either using a subset of a processing unit's combination of values to obtain consequences or using a subset of the values and consequences to determine whether a constraint is satisfied for the processing unit's combination of values. A constraint checking operation thus performs a logical or arithmetic operation using the contents of a processing unit's memory and can write the result into the memory, from which it can be read for further processing. A processing unit whose combination of values violates a constraint can simply terminate—other processing units are concurrently handling the other alternatives.

Assigning a value to a previously unassigned variable increases the number of valid processing units, and can be done with an operation called "forking" as explained in the column processing application. Constraint checking may determine that a processing unit's combination of values is inconsistent. Inconsistent processing units can be removed from the set of valid processing units on a substrate by a "kill" operation, also explained in the column processing application.

The stage shown in boxes 154 and 156 occurs after some number of forking, constraint applying, and killing operations have been performed. As a result of those operations, the first processing unit is valid and the second processing unit is either still invalid or has been made invalid by a kill operation.

After a number of forking and killing operations, the numbers of valid processing units on different substrates may become imbalanced. A "balancing" operation can be performed to transfer a processing unit's data from one substrate to another in order to balance the number of valid processing units on each substrate. A balancing operation is shown in two stages in FIG. 6. In the first stage, in boxes 160 and 162, the data of the first processing unit is copied to the second processing unit. In addition, a bit of data, shown as the "B" bit, is saved for use in the second stage of balancing. Then, in the second stage, in boxes 164 and 166, a kill operation clears the first processing unit's valid bit based on its B bit in order to remove it from the set of valid processing units on the first substrate. The second processing unit remains valid because its B bit indicated that it was not a source in the balancing operation.

In FIG. 6, each processing unit's value of the B bit indicates whether the processing unit was the source of a transfer made during the balancing operation. The B bit could be a bit in each processing unit's respective memory that is not copied in the balancing operation or it could be a bit in a temporary memory element.

The function of accumulating results can be performed after all choices have been made and all constraints checked. Any processing unit that is still valid is then storing data defining a solution of the variable assignment search. An example is shown in box 166 in FIG. 6. The step in box 168 can then accumulate results. For example, for an overall determination of whether there are any solutions, a count operation could count the number of valid processing units; if there is at least one, there is a solution. A logical or arithmetic operation could be used to set a results field in all valid processing units with solutions that meet a criterion. The count operation can then be performed on the results field to determine whether any processing units have solutions that meet the criterion. For detailed information about each solution, the data indicating each valid processing unit's combination of values can be read out.

A central controller can be used to control processing units on a number of interconnected substrates to perform value assignment search. The controller can initialize the processing units and other circuitry on the substrates, selecting one processing unit on one substrate as the initial valid processing unit. The controller can control the processing units to make choices and check constraints by requesting forking, by requesting logical or arithmetic operations applying constraints, and by killing inconsistent processing units. When appropriate, the controller can request balancing operations. When all constraints have been applied, the controller can accumulate the results.

D. Implementations

The general features described in relation to FIGS. 1–6 could be implemented in many ways. Various host systems and interfacing techniques could be used, various substrates could be used, various techniques for forming circuitry at the surface of a substrate could be used, and various types of digital logic could be used. The following description is applicable to any available combination of substrate, processing technology, and logic that is capable of providing an integrated circuit, except where specifically otherwise noted, and is one example of how the general features could be implemented in a processor that could be interfaced in any appropriate way with any host system. The following description builds on features described in copending coassigned U.S. patent application Ser. No. 07/628,916, now issued as U.S. Pat. No. 5,325,500, entitled "Parallel Processing Units on a Substrate, Each Including a Column of Memory" and incorporated herein by reference ("the column processing application").

1. Coprocessor

Figure 7:
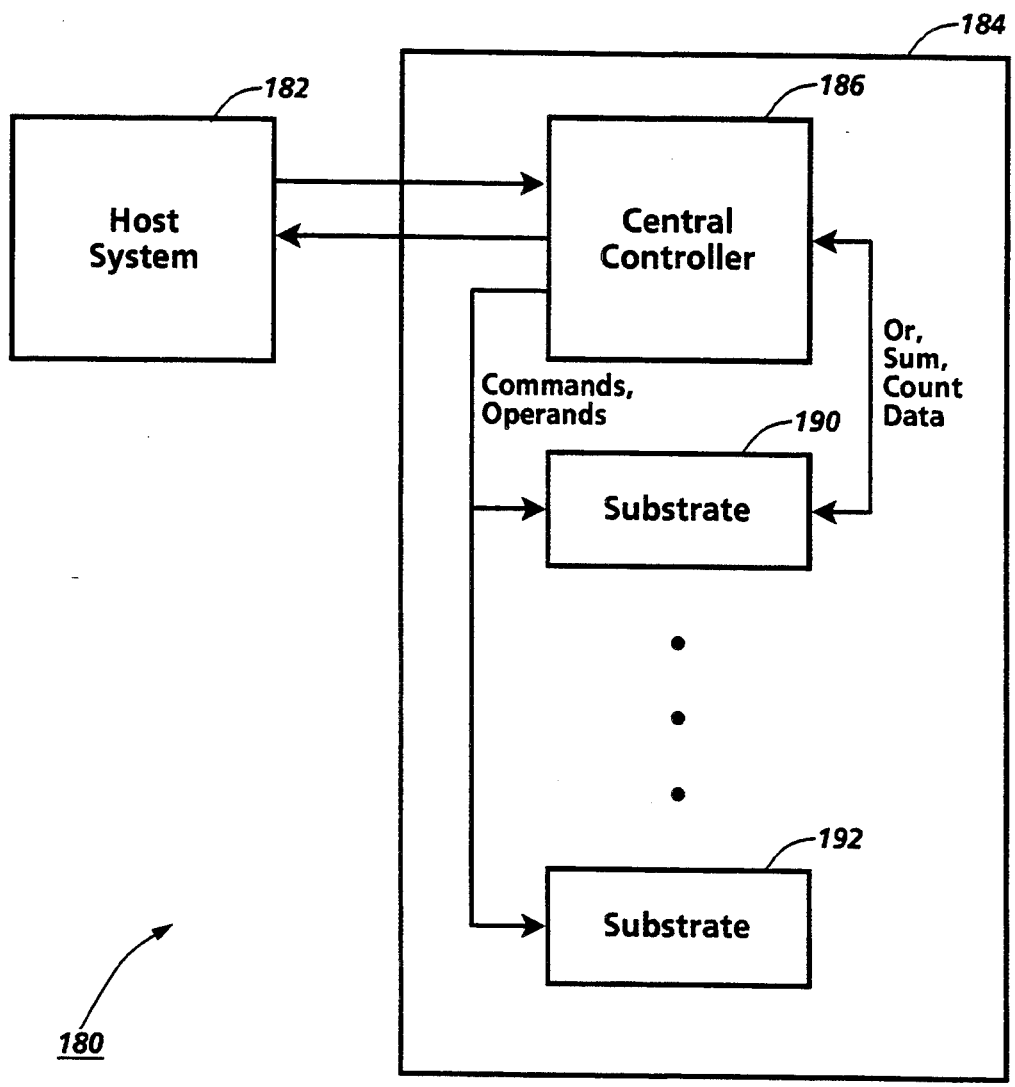
FIG. 7 is a schematic block diagram showing components of a system that includes a coprocessor with interconnected substrates.
Figure 8:
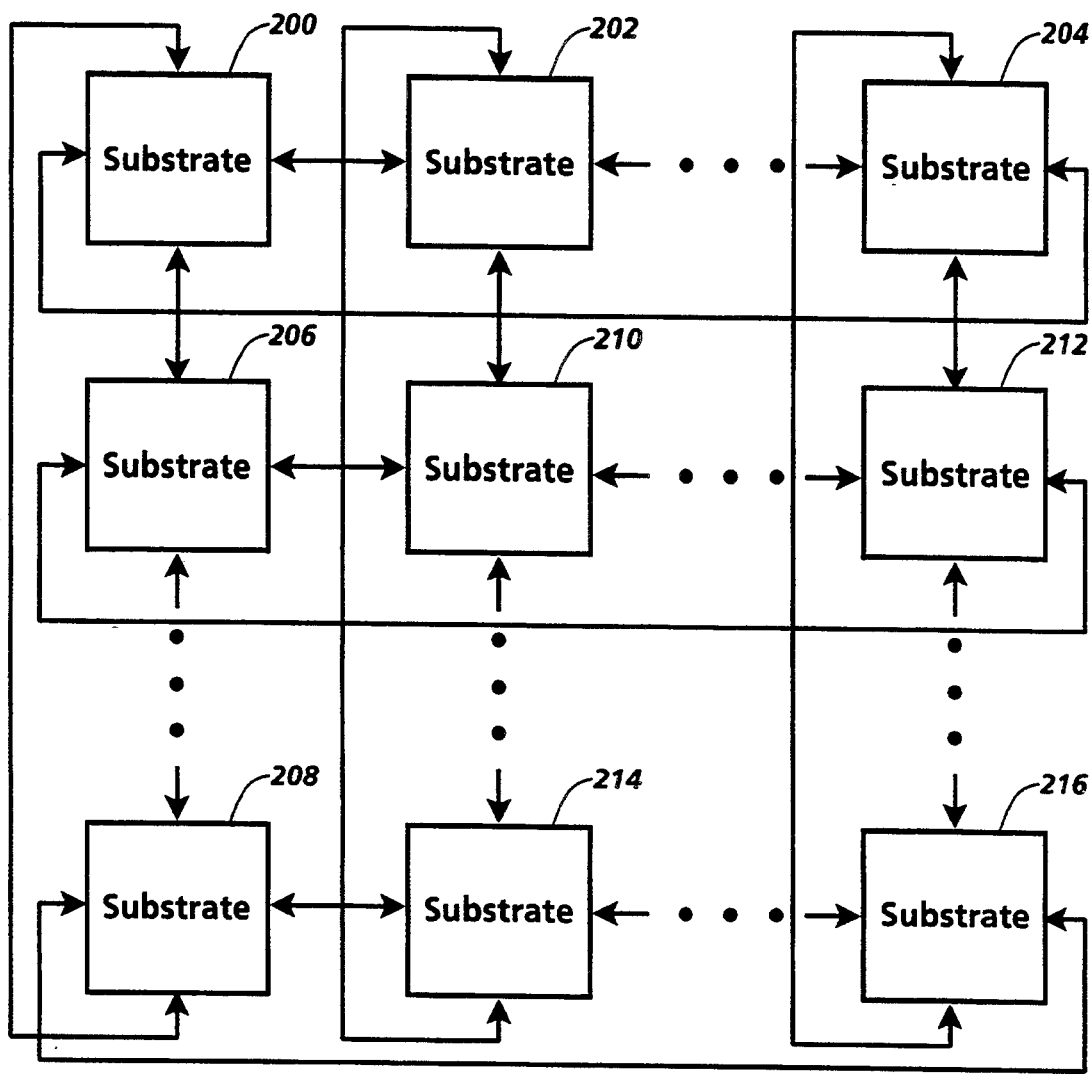
FIG. 8 is a schematic block diagram showing interconnections between substrates.
Figure 9:
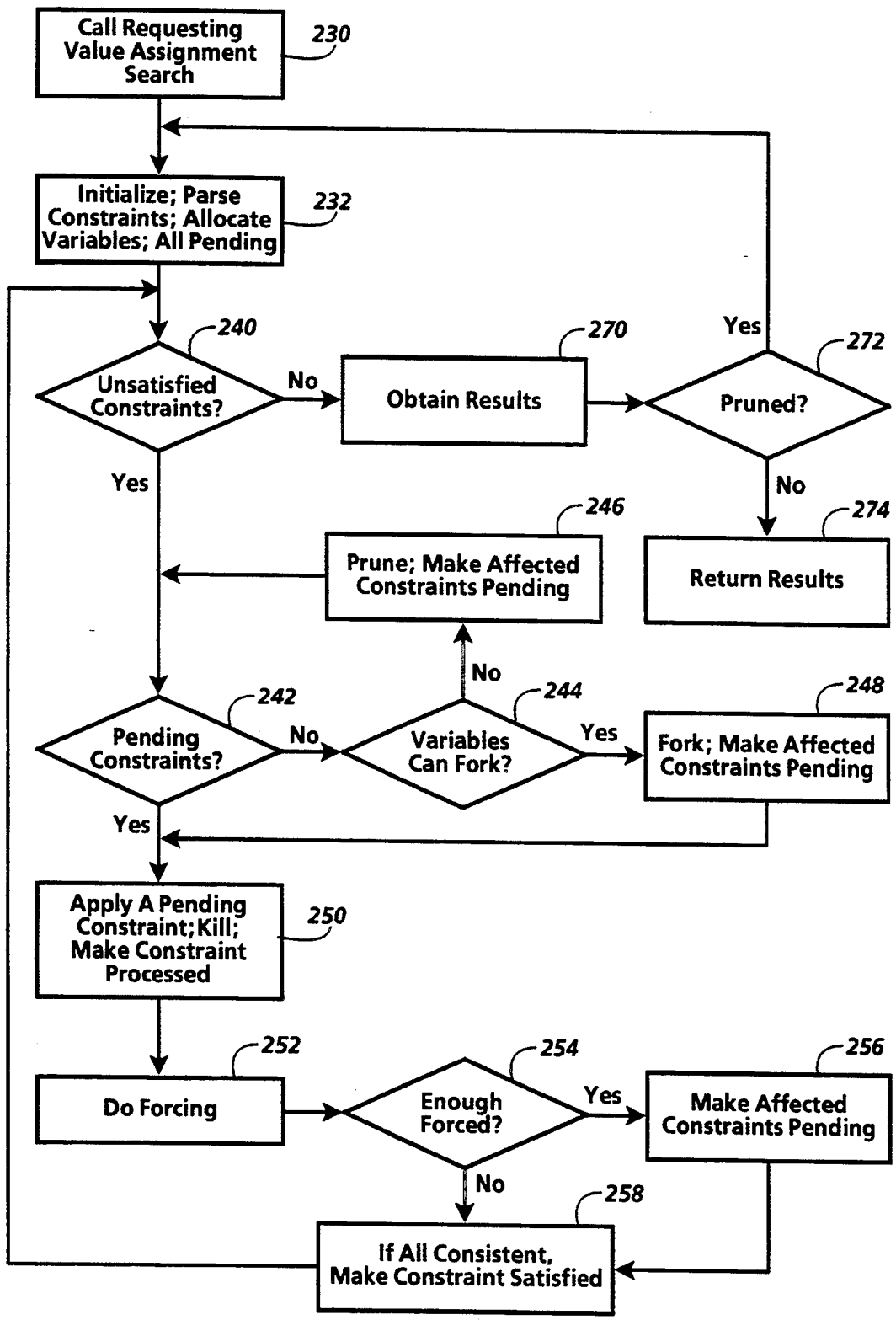
FIG. 9 is a flow chart showing steps in value assignment search.
Figure 10:
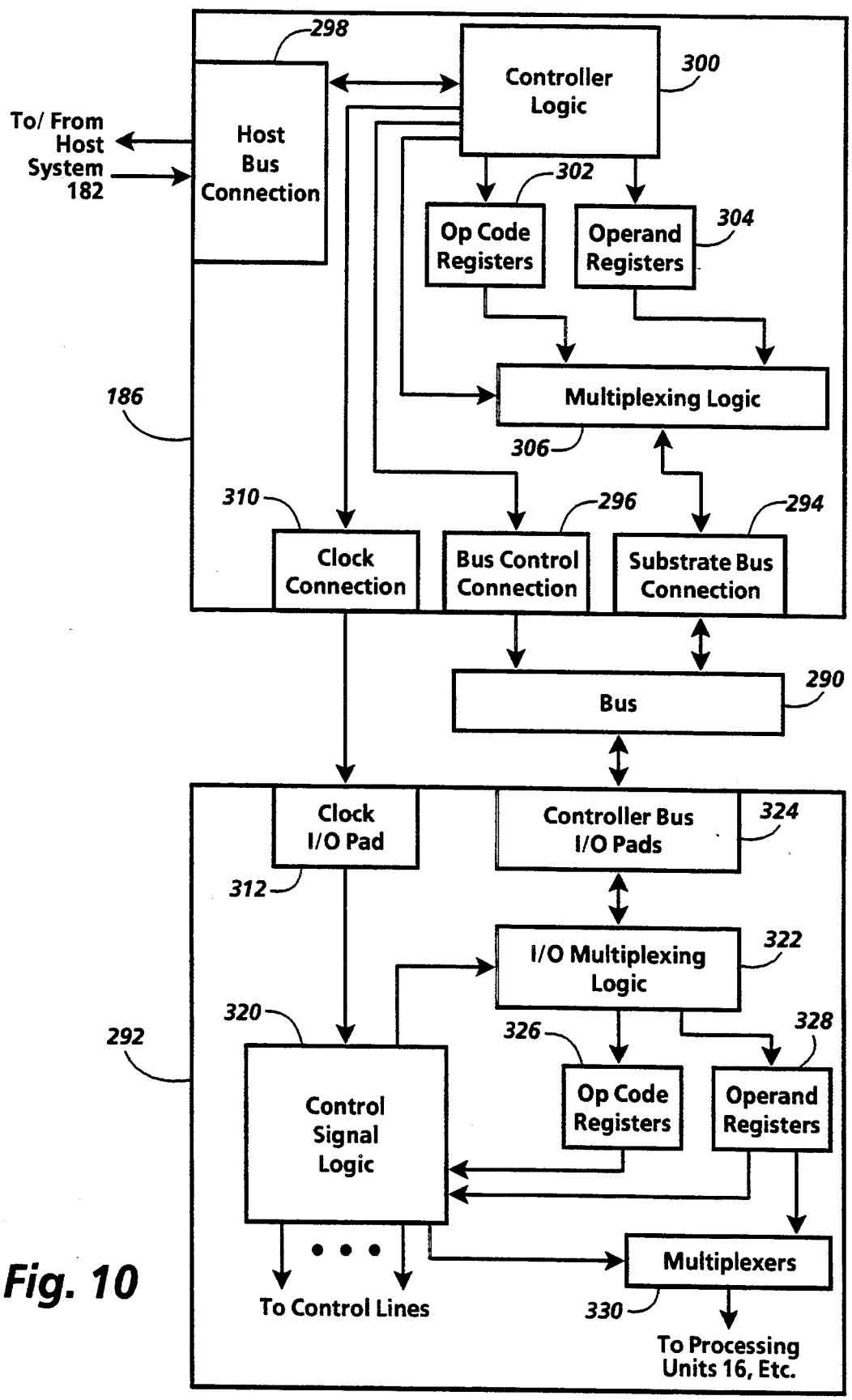
FIG. 10 is a schematic block diagram showing components in the central controller and one of the substrates in FIG. 7.

FIG. 7 shows a system that includes a coprocessor with substrates and a central controller. FIG. 8 shows an example of interconnections between the substrates. FIG. 9 shows host system steps in value assignment search. FIG. 10 shows circuitry in the central controller and in one of the substrates by which the controller and the substrate exchange data.

System 180 in FIG. 7 includes host system 182 and coprocessor 184. Host system 182 could be a Sun or Symbolics workstation or other conventional system capable of executing software requesting value assignment search operations. The Massively Parallel ATMS application, incorporated herein by reference above, explains the operation of a host, including an inference engine that requests propositional reasoning, one type of value assignment search.

Host system 182 can include a VME bus or other conventional interface to which coprocessor 184 can be connected. Coprocessor 184 could include one or more printed circuit boards with appropriate plug connections for connecting to host system 182. Coprocessor 184 includes central controller 186 connected for receiving requests for value assignment search from host system 182 and for providing results of value assignment search to host system 182.

Controller 186 can be a conventional microprocessor or other appropriate component mounted on a printed circuit board and capable of receiving requests for value assignment search from host system 182 and converting the requests into appropriate sequences of commands to substrates 190 through 192. Coprocessor 184 is a single instruction multiple data (SIMD) machine with a large number of simple processing units, with many processing units on each of a large number of substrates. Each processing unit has respective memory that can be thought of as a bit vector, and the controller can determine what each bit position is used for, including the valid bit, described above in relation to FIG. 6. Bit positions can, for example, be used to store data indicating values of basic assumptions, data indicating values of propositions derived from basic assumptions, or temporary data used during value assignment operations.

Central controller 186 can be connected with substrates 190 through 192 with a bus over which it broadcasts commands and operands to all substrates simultaneously. Controller 186 can also be connected to substrate 190 by a serial channel just as if controller 186 were a connected substrate, so that data can be transferred between substrate 190 and controller 186 even though substrate 190 operates in the same way as the other substrates. As shown, this serial channel can carry OR data, sum data, or count data.

Each of substrates 190 through 192 can include one thousand or another appropriate large number of processing units, and can be implemented for high processing unit density in the manner described in the column processing application. Each substrate can be packaged in a conventional package such as a zip or dip package for mounting on the printed circuit board with controller 186 or on another connected printed circuit board. In this way, it should be feasible to achieve a total of one million processing units, by mounting 1000 packaged substrates on one or more connected printed circuit boards.

In addition to their connections to controller 186, substrates 190 through 192 are interconnected for transfer of data. FIG. 8 shows an illustrative two-dimensional grid topology of interconnection in which each substrate is connected to four other substrates. Each connection between substrates is a single serial channel. For example, substrate 200 is connected by serial channels to substrates 202, 204, 206, and 208. Although not connected by serial channels to substrates 210, 212, 214, and 216, substrate 200 has a path to each of them that includes only two serial channels and an intermediate substrate. If the grid is N substrates by N substrates, the maximum number of serial channels between two substrates is N with this topology. In other words, every substrate is directly or indirectly connected to every other substrate by a path that includes no more than N serial channels.

A two-dimensional grid topology as in FIG. 8 may be satisfactory for a relatively small N, such as N=10. In general, however, the balancing techniques with inter-substrate transfer of data as described below are more efficient when the maximum number of serial channels between two substrates is small. Therefore, for a larger number of substrates, a smaller diameter topology, such as a perfect shuffle network, may be better.

FIG. 9 shows steps that host system 182 can follow in performing value assignment search using coprocessor 184. The steps in FIG. 9 are independent of the interconnection topology among the substrates.

The step in box 230 receives a call requesting value assignment search using coprocessor 184. This call may come from a routine that applies criteria to determine whether a value assignment search problem can be handled in another way and to determine whether the problem is suitable for solution by coprocessor 184.

The step in box 232 initializes, both by setting up appropriate data structures in host system 182 and also by providing a request to coprocessor 184 for initialization. The step in box 232 can include operations that parse the constraints to be applied during value assignment search into parts, each of which can be treated as a constraint in the remaining steps in FIG. 9. For example, if each original constraint is converted to a conjunctive normal form in which it is a conjunction of disjunctions of simple variables, the step in box 232 can parse the original constraint so that each disjunction is treated as a constraint.

In FIG. 9, each constraint is in one of three states: satisfied, meaning that it is consistent for all valid processing units; pending, meaning that it has not been applied to some valid processing units for which it may be inconsistent; and processed, meaning that it has been applied, but that it may become inconsistent for some valid processing units when additional variables are assigned. Therefore, the step in box 232 starts with all constraints in the pending state because they have not yet been applied to any processing units.

The step in box 232 also allocates a field in each processing unit's memory for each variable that occurs in the constraints. Each variable's field can be two bits, with a first bit indicating whether it has been assigned a value and a second bit indicating a value when assigned. The step in box 232 can set all the first bits to indicate unassigned values.

The step in box 240 begins a loop, each iteration of which attempts to handle a pending constraint. The step in box 242 first tests whether any constraints are pending. If not, the step in box 244 determines whether any of the variables could be forked. If not, it is necessary to prune the search space, in the step in box 246. The search space can be pruned by forcing one of the variables to one of its values, with the value assignment search for the other value being done separately. An implementation of pruning is described below. The step in box 246 also makes any processed constraints that include the forced variable pending so they can be applied again. But if any of the variables could be forked, the step in box 248 chooses a variable and forks, again making any processed constraints that include the forked variable pending so they can be applied again.

The choice of which variable to fork can be based on the number of processing units that could fork on the variable and on the number of processed constraints that include the variable. Host system 182 can obtain information about the number of forking processing units by providing requests to coprocessor 184 that cause it to provide pertinent data. In general, the variable that has the least forking processing units and the most affected processed constraints is the best choice. A variable with no affected processed constraints should not be forked because forking it will increase the number of valid processing units without leading to any further killing of inconsistent processing units. An implementation of forking is described below.

The step in box 248 can also include balancing, either before or after the forking operation. Balancing can be performed before forking to provide enough invalid processing units on each substrate so that the number of valid processing units on all substrates will be approximately equal after forking. Balancing can be performed after forking until all substrates have approximately the same number of valid processing units, but this may not be as effective as balancing before forking because some substrates may have insufficient invalid processing units to complete forking. An implementation of balancing is described below.

The step in box 250 then applies one of the pending constraints, kills any processing units that are inconsistent, and makes the applied constraint a processed constraint. In this step, host system 182 provides requests to coprocessor 184 to perform logical or arithmetic operations that apply the constraint and obtain data indicating whether each processing unit is inconsistent with the constraint, and then to perform an operation that kills inconsistent processing units. To apply the constraint and to kill, host system 182 can request that controller 186 provide commands of the form:

CalculateOpCode(d, f, a1, a2), which is explained in the column processing application.

The kill operation is vital because the number of processing units needed for value assignment search would otherwise grow exponentially, rapidly consuming all available processing units. Quickly killing as many valid processing units as possible prevents this, and the best strategy is usually to apply all constraints before forking another variable so that as many processing units as possible are killed. For greater efficiency, the constraints could be applied in an order that reduces the number of times constraints must be revisited.

The step in box 252 is based on the fact that each constraint is a disjunction due to the parsing performed in box 232. As a result, applying a disjunctive constraint will produce one of four results in each processing unit: If a processing unit has the value OFF for all of the disjuncts of the disjunction after applying the constraint, then the disjunction is inconsistent for the processing unit; if a processing unit has the value ON for any of the disjuncts of the disjunction after applying the constraint, then the disjunction is consistent for the processing unit; if a processing unit has the value ON for none of the disjuncts of the disjunction but has more than one disjunct with the NULL value after applying the constraint, then the disjunction is indeterminate for the processing unit; and if a processing unit has the value ON for none of the disjuncts of the disjunction but has one and only one disjunct with the NULL value after applying the constraint, then the disjunction is forced for the processing unit because the disjunct with the NULL value can be forced to the value ON to make the disjunction consistent.

In the step in box 252, host system 182 requests that central controller 186 provide calculate commands so that each processing unit in which the disjunction can be forced operates to force the appropriate disjunct. The disjunction thus becomes consistent for the forcing processing units. Then, the step in box 254 determines whether enough processing units were forced to make it worthwhile to change affected processed constraints to their pending state. This can be done by comparing the number of forced processing units with an appropriate threshold number of processing units; for a processor with N processing units, the square root of N may work well as a threshold. The number of forced processing units can be obtained by a hierarchical intersubstrate count operation, as described below. This test can produce as much as a factor of four improvement in performance because of the amount of time it saves. If the number of forced processing units is great enough, the step in box 256 changes any processed constraints that include the forced variables to the pending state.

The step in box 258 checks, for each constraint, whether, after forcing, all processing units are consistent with the constraint. This can be done with a hierarchical intersubstrate OR operation, as described below. If so, the constraint is satisfied, so that it need no longer be considered.

When all of the constraints are satisfied, the step in box 270 provides requests to coprocessor 184 to obtain results based on the data in the processing units' memories. An implementation of obtaining results is described below. Then host system 182 determines in box 272 whether pruning was performed in box 246. If so, a new search is begun with the step in box 232, except that the variable that was forced to one value by pruning is forced to its other value for the new search, which can be done with calculate commands. If pruning was performed more than once, each possible combination of the variables forced during pruning must be handled by a new search: If two variables were forced, three additional combinations must be handled; if three were forced, seven additional combinations must be handled; and so forth.

When no constraints are unsatisfied and all pruned combinations of values have been tried, the search is finished. The results obtained in each iteration of the step in box 270 can be returned to the routine that provided the call for value assignment search, in the step in box 274.

In response to the various requests from host system 182, controller 184 provides appropriate commands and data to the substrates and also receives data from the substrates. FIG. 10 shows components for transfer of commands and data between central controller 186 and one of the substrates.

Bus 290 connects to substrate 292 and to substrate bus connection 294 of controller 186. Controller 186 includes bus control connection 296 through which it controls bus 290, preventing collisions. Host bus connection 298 is similarly connected for receiving commands and data from host system 182 and for providing data.

Controller logic 300 responds to commands from host system 182 by providing control signals and data to other components in controller 186, some of which are shown. For example, a command may be handled by providing a sequence of commands in parallel to substrate 292 and the other substrates. Each command in the sequence may include an op code, loaded into op code register 302, and one or more operands, loaded into operand registers 304. Then controller logic 300 can provide signals to multiplexing logic 306 and can control bus 290 through bus control connection 296 so that the op code and operands are transmitted to substrate 292.

Controller logic 300 can also, through clock line connection 310, provide clock signals which are received by I/O pad 312 on substrate 292. In response to the clock signals, control signal logic 320 controls I/O multiplexing logic 322 so that the op code and operands from bus 290, appearing at controller bus I/O pads 324, are latched and provided to op code register 326 and operand registers 328. In response to further clock signals, control signal logic 320 provides control signals to other components on substrate 292 based on contents of op code register 326 and operand registers 328. For example, control signal logic 320 may control multiplexers 330 to provide operands to processing units 16 or to other logic such as row select logic in the implementation described in the column processing application incorporated herein by reference.

As discussed above, central controller 186 can include circuitry like that on substrate 292 so that it could be connected to one of the substrates as if it were a connected substrate, in which case no special circuitry is necessary on substrate 292 to provide signals to controller logic 300. Substrate 292 could also include additional circuitry (not shown) through which control signal logic 320 could provide signals to controller logic 300, through bus 290 or through additional lines. For example, substrate 292 could be connected to central controller 186 by a bit line that could be pulled up or down by any substrate to provide a signal to controller logic 300. Controller logic 300 could then provide further control signals based on the signals from substrate 292 or could provide data to host system 182 through host bus connection 298.

The components in FIG. 10 and other components on substrate 292 can be used to perform operations requested by host system 182 in the manner described below. Although initialization occurs before the other operations, it is described last because it depends on commands and circuitry used in other operations.

2. Forking

As shown in FIG. 9, forking involves steps that determine whether any variable can be forked, shown in box 244, and steps that perform the forking operation, in box 248. The steps in boxes 240 and 242 can also relate to forking.

Figure 11:
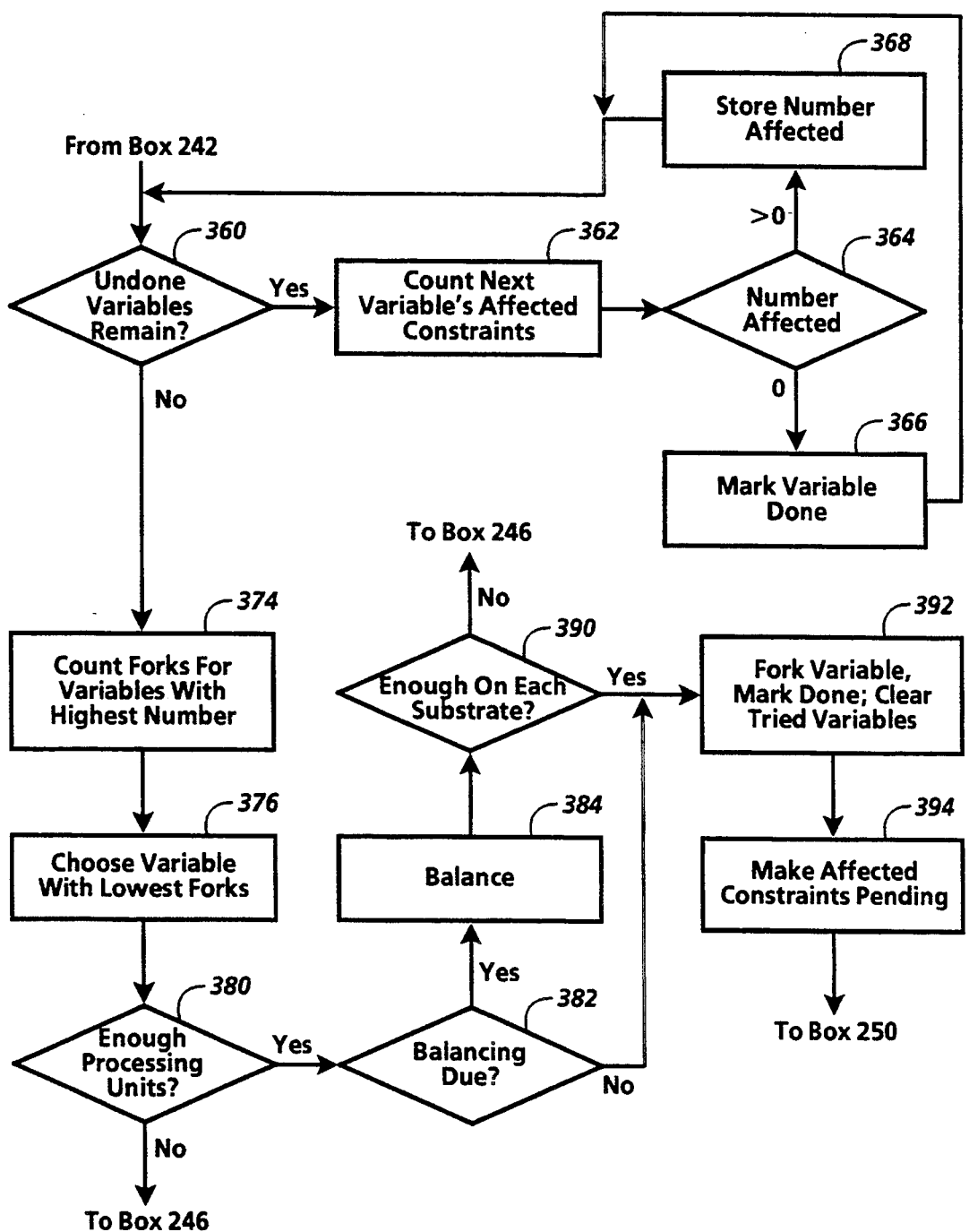
FIG. 11 is a flow chart showing steps related to forking in FIG. 9.

FIG. 11 shows steps related to forking in greater detail, including steps that determine whether to fork, which variable to fork, whether to balance, and whether to prune. The steps in FIG. 11 can be performed after the step in box 242 in FIG. 9. The steps in FIG. 11 implement the steps in boxes 244 and 248 in FIG. 9.

The step in box 360 begins an iterative loop that goes through all the variables that might yet have an unassigned value in any of the processing units, referred to as undone variables. A variable is done if it has been forked or forced to one of its values during pruning or, even if it has not been forked or forced, if none of the unsatisfied constraints includes it. The step in box 362 counts the unsatisfied constraints that include the next undone variable. The step in box 364 branches based on the result. If the number is zero, then the variable is marked done in box 366, because there would be no purpose in forking it. If the number is greater than zero, the number is stored as the number affected for the variable.

The step in box 374 takes the highest number of affected constraints for the remaining undone variables, based on the step in box 362, and counts the number of forking processing units for each of the variables having the highest number, referred to as the "most affected variables."

The step in box 376 then chooses the variable with the lowest number of forks from box 374 for an attempted fork. The step in box 380 determines whether there are enough invalid processing units to allow forking of the chosen variable. This step requires an intersubstrate count as described below. If there are not enough invalid processing units, the step in box 246 in FIG. 9 is performed to prune the search space by forcing the chosen variable.

If there are enough invalid processing units to fork the variable chosen in box 374, the step in box 382 determines whether balancing is due. If so, the step in box 384 performs balancing in the manner described below. After balancing, the step in box 390 determines whether each substrate has enough processing units to fork the variable. If not, the step in box 246 in FIG. 9 is performed to prune the search space by forcing the chosen variable, as with the step in box 380. If there are enough processing units, forking is performed in the step in box 392, which can be done by following the steps as described in the column processing application. The step in box 392 also marks the forked variable clone. Then, the step in box 394 changes any processed constraints that include the forked variable to the pending state.

Many of the steps in FIG. 11 can be performed by host system 182, since it can manage the variables and constraints without reference to coprocessor 184. But some of the steps require operations by central controller 186 and processing units on substrates 190 through 192. Specifically, the steps in boxes 374, 380, and 390 all require information about processing units with data meeting a criterion, which can be obtained by hierarchical operations as discussed immediately below. An implementation of the balancing step in box 384 is also described below and an implementation of forking in box 392 is described in the column processing application incorporated herein by reference.

3. Hierarchical Operations

The serial channels between substrates can also be used to transfer data used in hierarchical operations. Such operations can be used in performing a number of the steps in FIGS. 9 and 11.

The decisions about forking in boxes 244 and 248 in FIG. 9 and in boxes 374, 380, and 390 in FIG. 11 can include a hierarchical count operation to determine the number of processing units that require forking for each variable, a hierarchical count operation to determine whether there are enough available processing units to fork a variable, and a hierarchical OR operation to determine whether any of the substrates have insufficient available processing units to fork a variable.

The choice of a variable to prune in box 246 in FIG. 9 can include hierarchical count operations to determine, for each variable, the number of processing units that would become available if it were forced to one value or the other. Similarly, the determination of whether enough processing units have been forced in box 254 in FIG. 9 can include hierarchical count operations to determine the number of processing units forced. The step in box 258 in FIG. 9 can include a hierarchical OR operation to determine whether all the processing units are consistent with a constraint.

Figure 12:
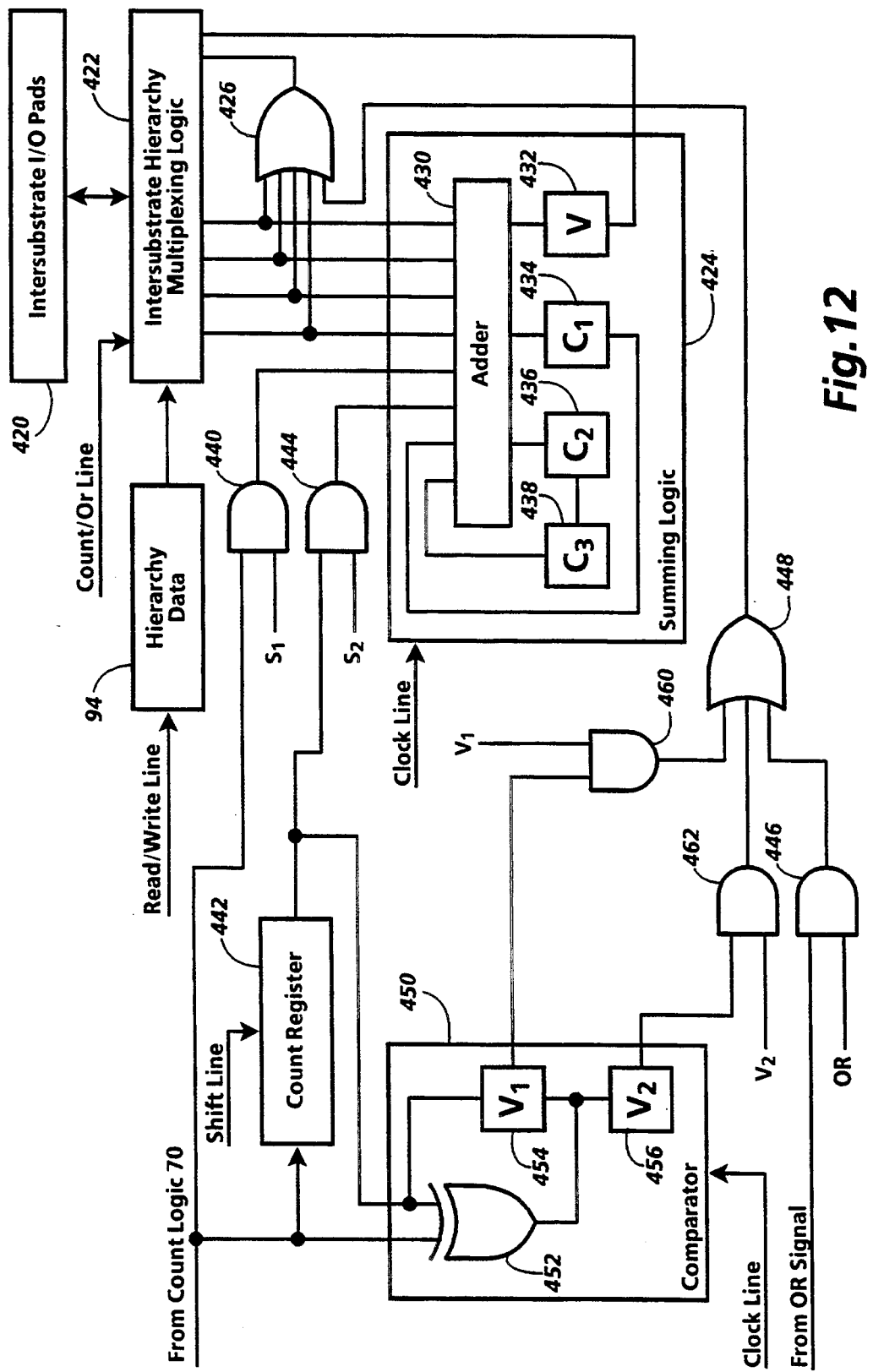
FIG. 12 is a schematic block diagram showing components on the substrate of FIG. 10 that perform hierarchical operations.
Figure 13:
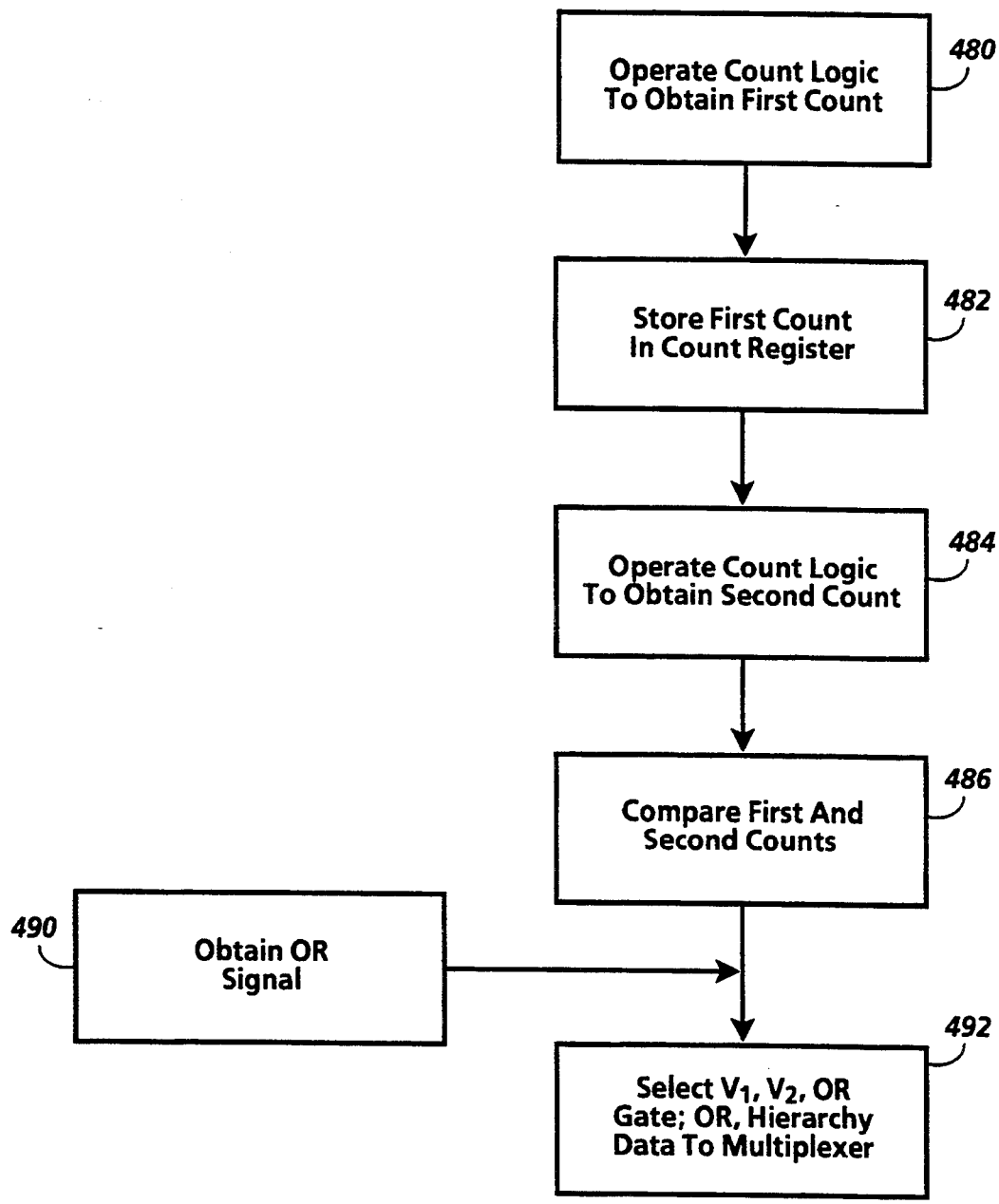
FIG. 13 is a flow chart showing steps in a hierarchical OR operation with the components in FIG. 12.
Figure 14:
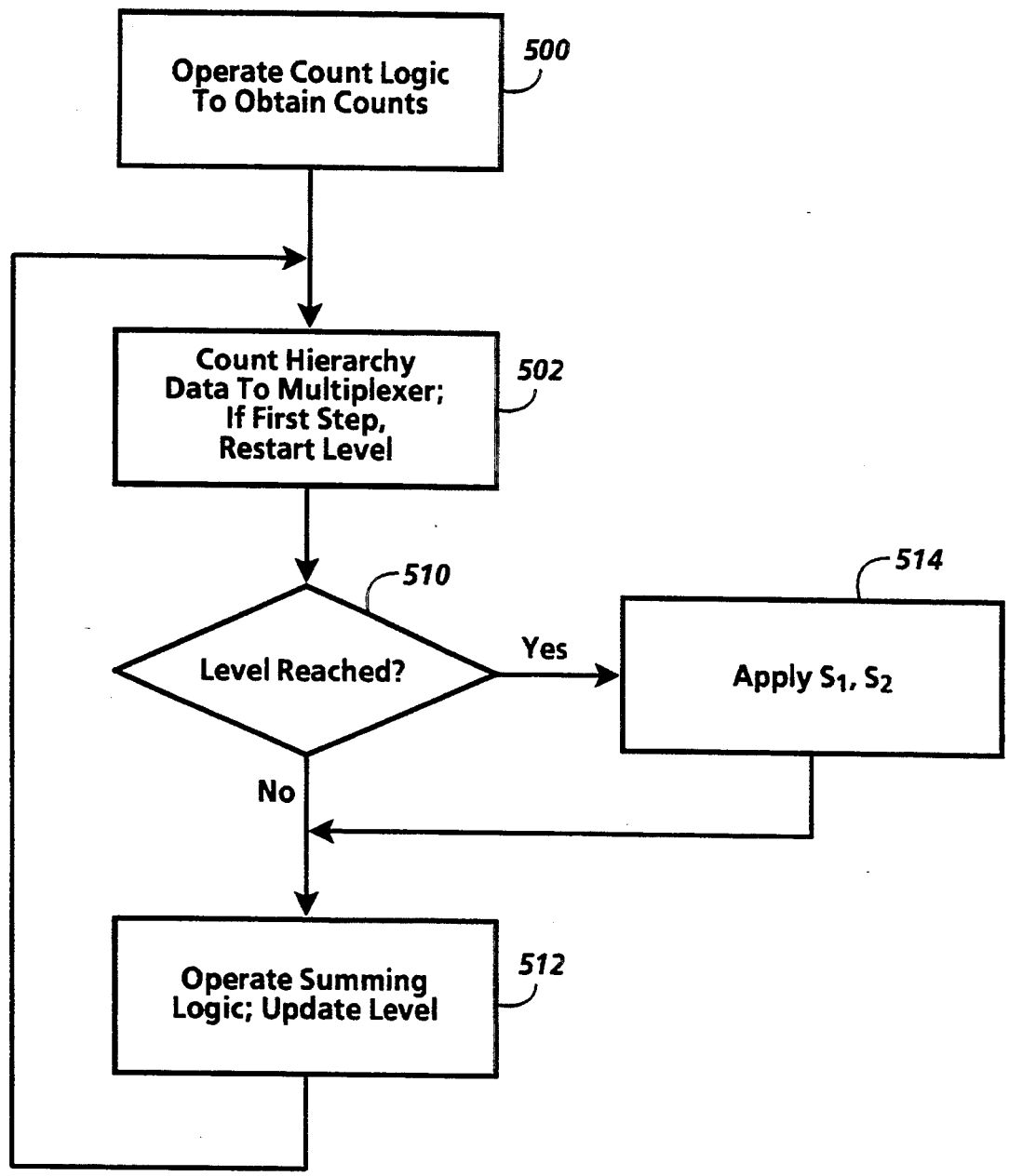
FIG. 14 is a flow chart showing steps in a hierarchical sum operation with the components in FIG. 12.

FIG. 12 shows components for performing hierarchical intersubstrate OR and count operations. FIG. 13 shows steps in an intersubstrate OR operation. FIG. 14 shows steps in an intersubstrate counting operation.

FIG. 12 shows components on substrate 292 in addition to those shown in FIG. 10. Each of a number of intersubstrate I/O pads 420 is connected through a respective serial channel to an intersubstrate I/O pad on another substrate. Intersubstrate hierarchy multiplexing logic 422 determines which of intersubstrate I/O pads 420 are connected to summing logic 424 and to OR gate 426, either to provide data from another substrate or to provide data to another substrate during a hierarchical counting or OR operation. In FIG. 12, the substrate can be connected to as many as four other substrates, so that four lines from multiplexing logic 422 provide data to each of summing logic 424 and OR gate 426; at any given time, at most three of these lines provide data from other substrates and the fourth line is held OFF.

Summing logic 424, which implements sum logic 100 in FIG. 3, includes adder 430, which can be random logic, a PLA, or other circuitry that can receive a number of input bits and produce a set of output bits indicating the sum of the input bits. Adder 430 illustratively has eight input lines and three output lines; since at most three input lines provide data from other substrates at a time, the total number of ON bits received never exceeds seven, so that three output lines are sufficient to provide the sum of the input lines. Value store 432 receives the low order output bit and provides it as output from summing logic 424. First carry store 434 receives the intermediate order output bit, and second carry store 436 receives the high order output bit. The data in first carry store 434 is provided as an input to adder 430 during the next adding cycle. The data in second carry store 436 is transferred to third carry store 438 during the next cycle and is then provided as an input to adder 430 during the following adding cycle.

One of the other two input lines to summing logic 424 provides data directly from count logic 70 in FIG. 3, which can be implemented as described in the column processing application, through AND gate 440, which can be enabled by select line $S_1$. The other provides data from count register 442 through AND gate 444, enabled by select line $S_2$. Count register 442 can be loaded from count logic 70.

OR gate 426 illustratively has five input lines, four from other substrates and one from an OR signal generated on substrate 292, which could be implemented as described in the column processing application. The OR signal is provided to OR gate 426 through AND gate 446, enabled by select line OR, and through OR gate 448, which simply functions to combine the OR signal with signals indicating the results of a comparison performed by comparator 450.

Comparator 450 receives bits in parallel from count logic 70 and from count register 442, starting with the low order bits. XOR gate 452 receives each pair of bits and, if only one is ON, enables first value store 454 and second value store 456 so that each can store one of the received bits. When the highest order bit has been received, the data in first and second value stores 454 and 456 indicates which of the two sources provided a larger number and which provided a smaller number. Data from first value store 454 can be provided to OR gates 448 and 426 through AND gate 460, enabled by select line $V_1$, and data from second value store 456 can be provided through AND gate 462, enabled by select line $V_2$.

The components in FIG. 12 can be operated as shown in FIG. 13 to perform hierarchical intersubstrate OR operations. FIG. 13 shows two different sequences of steps.

One sequence of steps begins by operating count logic 70 on substrate 292 to obtain a first count, in box 480. This first count is then stored in count register 442, in box 482, and count logic 70 is then operated to obtain a second count, in box 484. These steps can be performed in response to commands of the forms:

CountOpCode(s1) and
StoreCountOpCode, both of which are described in the column processing application in relation to an implementation of count logic 70. As indicated there, s1 indicates a bit position in each processing unit's memory that contains data indicating whether the processing unit should be counted. Control signal logic 320 can respond to StoreCountOpCode by providing appropriate signals to count logic 70 so that it provides count data, low order bit first, and by providing appropriate signals on the shift line of count register 442 to load count data received from count logic 70.

When the first and second counts have both been obtained, the step in box 486 operates comparator 450 to compare them. This step can be performed in response to a command of the form:

CompareCountsOpCode.

In responding to such a command, control signal logic 320 can provide appropriate signals to count logic 70 and the shift line of count register 442 so that they provide their respective count data, low order bit first. Control signal logic 320 can also provide signals on the clock line of comparator 450 so that each pair of bits is stored in value stores 454 and 456 if XOR gate 452 detects that only one is ON.

The second sequence of steps begins by obtaining an OR signal on substrate 292 in box 490. If substrate 292 includes select decode logic as described in the column processing application, this step can be performed in response to a command of the form:

SelectOpCode(s2), where s2 indicates a bit position in each processing unit's memory indicating whether it is eligible for selection—the select decode logic performs an OR operation on the data in this bit position.

Both sequences of steps conclude with the step in box 492, in which control signal logic 320 provides a select signal to enable one of AND gates 460, 462, and 446, so that $V_1$, $V_2$, or the OR signal is provided through OR gate 448 to OR gate 426. In addition, control logic 320 provides signals on the count/OR line of multiplexing logic 422 to indicate that a hierarchical OR operation is being performed and on the read/write line of hierarchy data store 94 so that hierarchy data is provided to multiplexing logic 422 indicating whether to receive from or transmit to each connected substrate. In response, data from the appropriate connected substrates is provided on the input lines of OR gate 426 and data from the output line of OR gate 426 is provided to the appropriate connected substrate. This step can be performed in response to a command of the form:

HierarchyOROpCode(g1), where g1 indicates which of AND gates 460, 462, and 446 is enabled.

The steps in the first sequence in FIG. 13 can be used, for example, to determine whether any substrate has insufficient available processing units for a forking operation. The first count can be the number of processing units that need to fork on a variable and the second count can be the number of available processing units. A hierarchical OR operation in which g1 indicates gate 460 determines whether the number of forking processing units is greater than the number of available processing units on any of the substrates.

The components in FIG. 12 can be operated as shown in FIG. 14 to perform hierarchical intersubstrate sum operations. The step in box 500 in FIG. 14 performs steps like those in boxes 480, 482, and 484 in FIG. 13 to obtain one or two counts on which a hierarchical sum operation can be performed.

When the count data has been obtained, the remaining steps in FIG. 14 are repeated to obtain the hierarchical sum, which can be obtained in response to a sequence of commands, each of the form:

HierarchySumOpCode(I, S$_1$, S$_2$), where I is a boolean indicating whether this is the first step of a hierarchical sum operation, and where S$_1$ and S$_2$ are boolean values indicating respectively whether gates 440 and 444 should be enabled.

In response to this command, control signal logic 320 provides signals on the count/OR line of multiplexing logic 422 to indicate that a hierarchical count operation is being performed and on the read/write line of hierarchy data store 94 so that hierarchy data is provided to multiplexing logic 422 indicating whether to receive from or transmit to each connected substrate, in box 502. In response, data from the appropriate connected substrates is provided on the input lines of summing logic 424 and data from the output line of summing logic 424 is provided to the appropriate connected substrate. The step in box 502 also restarts a counter (not shown) in control signal logic 320 if I indicates that this is the first step. The counter can be restarted by retrieving data from hierarchy data store 94 indicating this substrate's level in the hierarchy.

The step in box 510 branches based on whether this substrate's level in the hierarchy has been reached, which occurs when the counter reaches a specified value. For example, if the levels are numbered from the bottom of the hierarchy to the top, the counter can be a downcounter, with the level being reached when it reaches zero. If this substrate's level has not yet been reached, the step in box 512 simply operates summing logic 424 by providing signals on its clock line so that value store 432 and carry stores 434, 436, and 438 store the data at their inputs to complete an adding cycle. The step in box 512 also updates the level, such as by decrementing the counter. But if this substrate's level has been reached, the step in box 514 applies the booleans S$_1$ and S$_2$ to enable one or both of gates 440 and 444 so that the appropriate count data is provided to adder 430 before the summing logic is clocked in box 512. The step in box 514 can also provide a clock signal to count logic 70 or a shift signal to count register 442 so that the next bit to be added is provided.

The steps in FIG. 14 can be followed, for example, to count the number of available processing units throughout a parallel processor that includes a number of substrates. The steps in FIG. 14 can also be followed to count the number of processing units that require forking for a variable.

In order to synchronize the operations of the substrates in the hierarchical operations of FIGS. 13 and 14, controller 186 can provide appropriate synchronizing clock signals through clock connection 310 to clock I/O pad 312 on each substrate. This can ensure, for example, that all of the substrates provide the output from OR gate 426 long enough to complete the hierarchical OR operation through all the substrates.

The circuitry in FIG. 12 could be modified to perform hierarchical operations to find the maximum or minimum of counts on the substrates. Count register 428 could be connected to OR gate 426 and could be modified so that it can shift in the reverse direction to provide high order bits before lower order bits. Count register 428 could also be modified so that it can respond to a signal by clearing itself if it provides a bit with the value OFF and also so that it can complement its contents. The maximum of counts could then be obtained by a hierarchical operation in which each count register is shifted in the reverse direction to provide its output bit to OR gate 426 and, if any of the substrates provide an ON bit, all count registers that provided an OFF bit are cleared. The minimum of counts could be obtained by a similar operation after each count register complements its contents.

The maximum and minimum counts could be used to determine when balancing is necessary or when it is completed, such as by obtaining the maximum and minimum numbers of processing units that would be active were a forking operation performed.

4. Balancing Operation

As described above, the frequency of balancing can be adjusted. For example, the rate of balancing could be tied to the rate at which constraints are applied, with a certain number of balancing operations being applied per constraint, or vice versa. The relative rates of balancing and constraints could be adjusted during value assignment search.

Another approach is to tie the rate of balancing to the rate of forking. One way to do this is to decide whether to perform balancing immediately before or after each forking operation. In FIG. 11, balancing can be performed before each forking operation, which could ensure sufficient invalid processing units on each substrate. The hierarchical OR and count operations described above can be used to obtain information about the numbers of valid, invalid, and forking processing units on the substrates.

In practice, it is inefficient to perform balancing before every forking operation. Also, it would be inefficient to perform balancing until a perfect balance between processing units is obtained. Therefore, it is appropriate to decide before each forking operation whether to perform balancing and to continue balancing until a relatively easy criterion is met.

The decision whether to perform balancing can take into account the likely needs of subsequent forking operations. A typical value assignment search begins with a single valid processing unit and performs a series of forking operations that rapidly increase the number of valid processing units until a constraint results in killing a number of processing units. After this point, the number of valid processing units fluctuates up and down with forking and killing operations, possibly exceeding the total available processing units at times and possibly decreasing to a very small number at times. During the initial increase in the number of valid processing units, it is important to balance before each fork because serious imbalances would otherwise occur. Similarly, if the number of valid processing units decreases to a very small number, serious imbalances could occur if the few remaining valid processing units are unevenly distributed. The rest of the time, it is sufficient to balance only when necessary because at least one of the substrates does not have enough invalid processing units for a forking operation.

Figure 15:
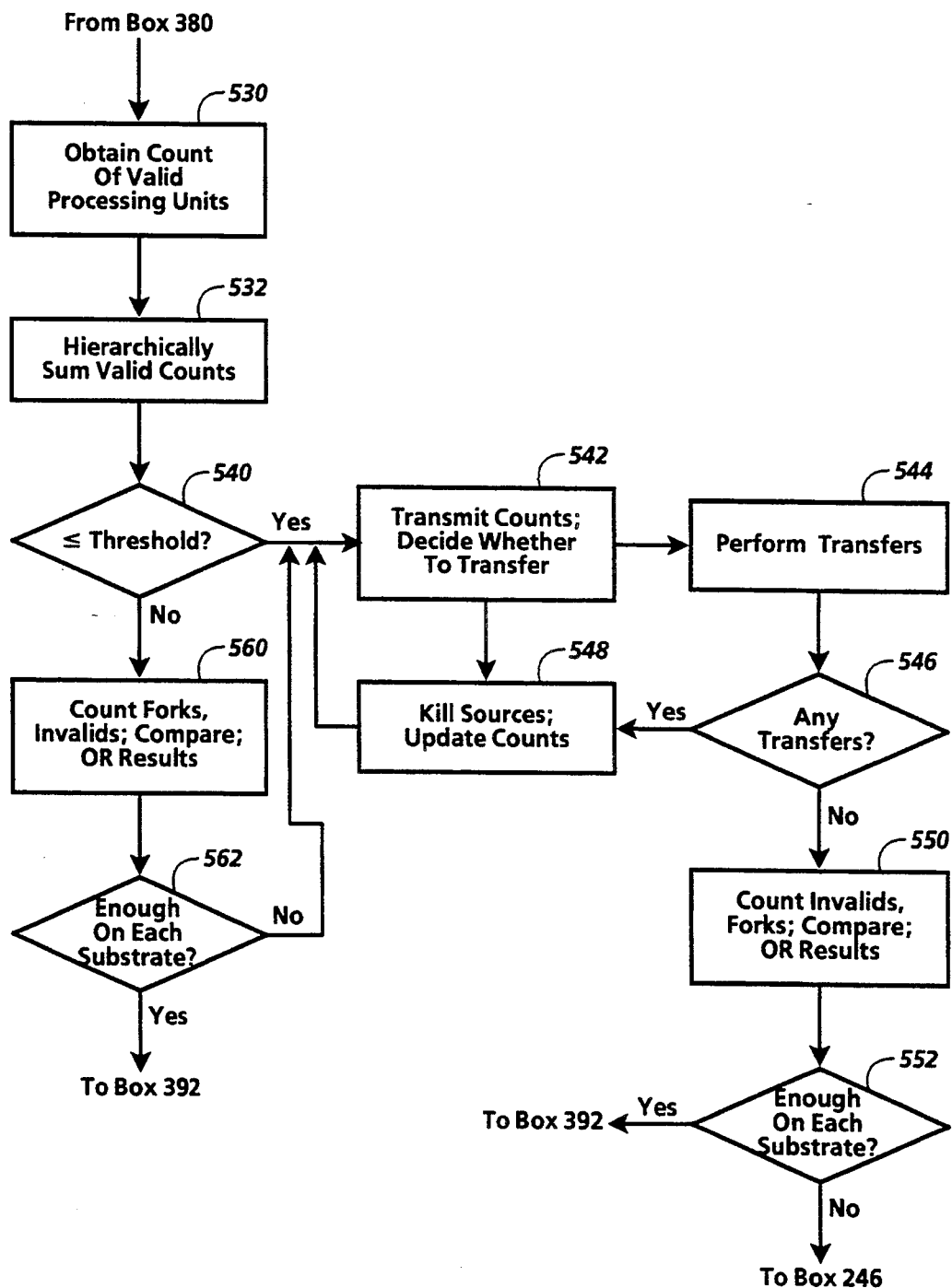
FIG. 15 is a flow chart showing steps in balancing in FIG. 11.
Figure 16:
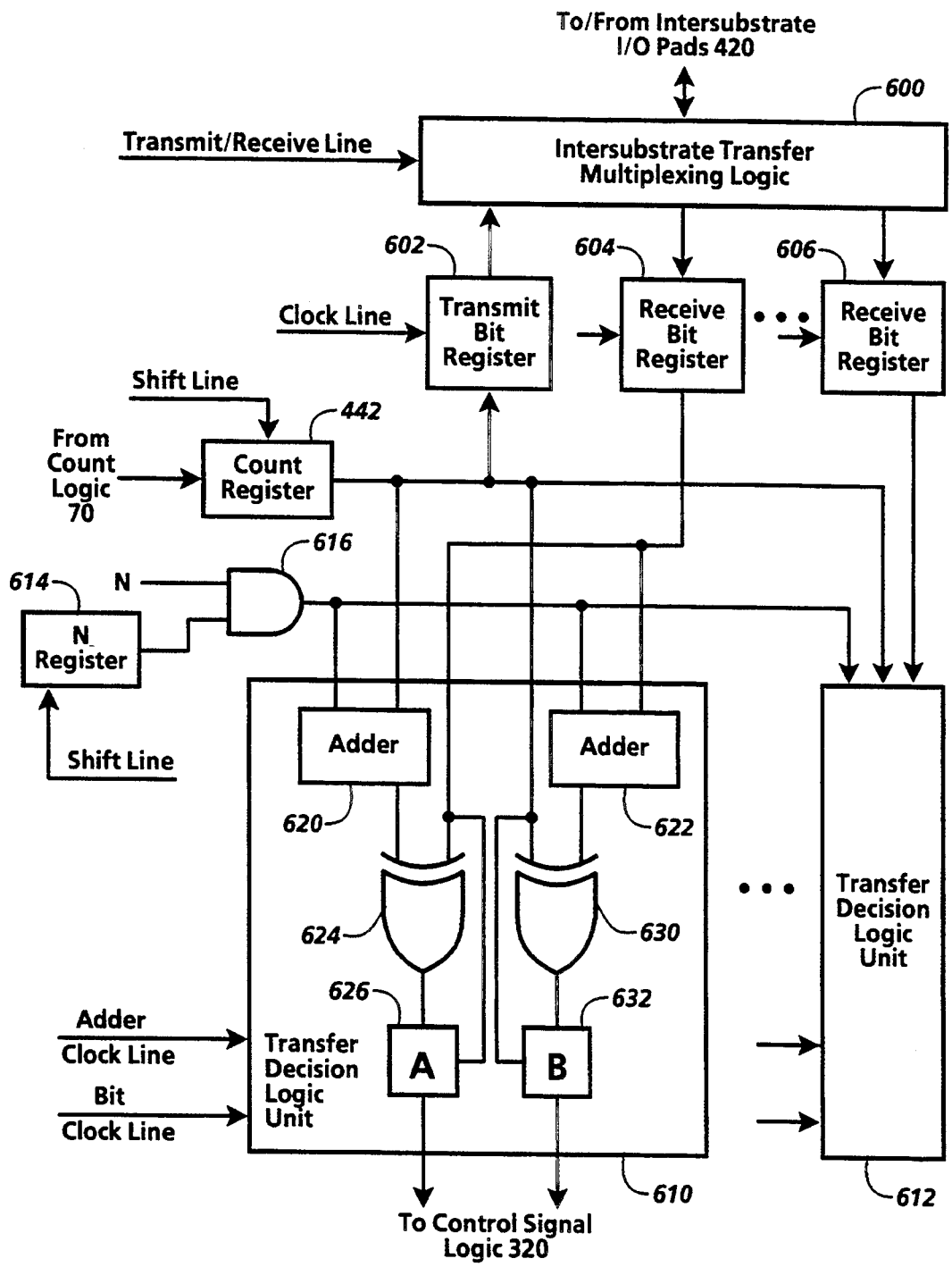
FIG. 16 is a schematic block diagram showing components on the substrate of FIG. 10 that perform balancing and related operations.
Figure 17:
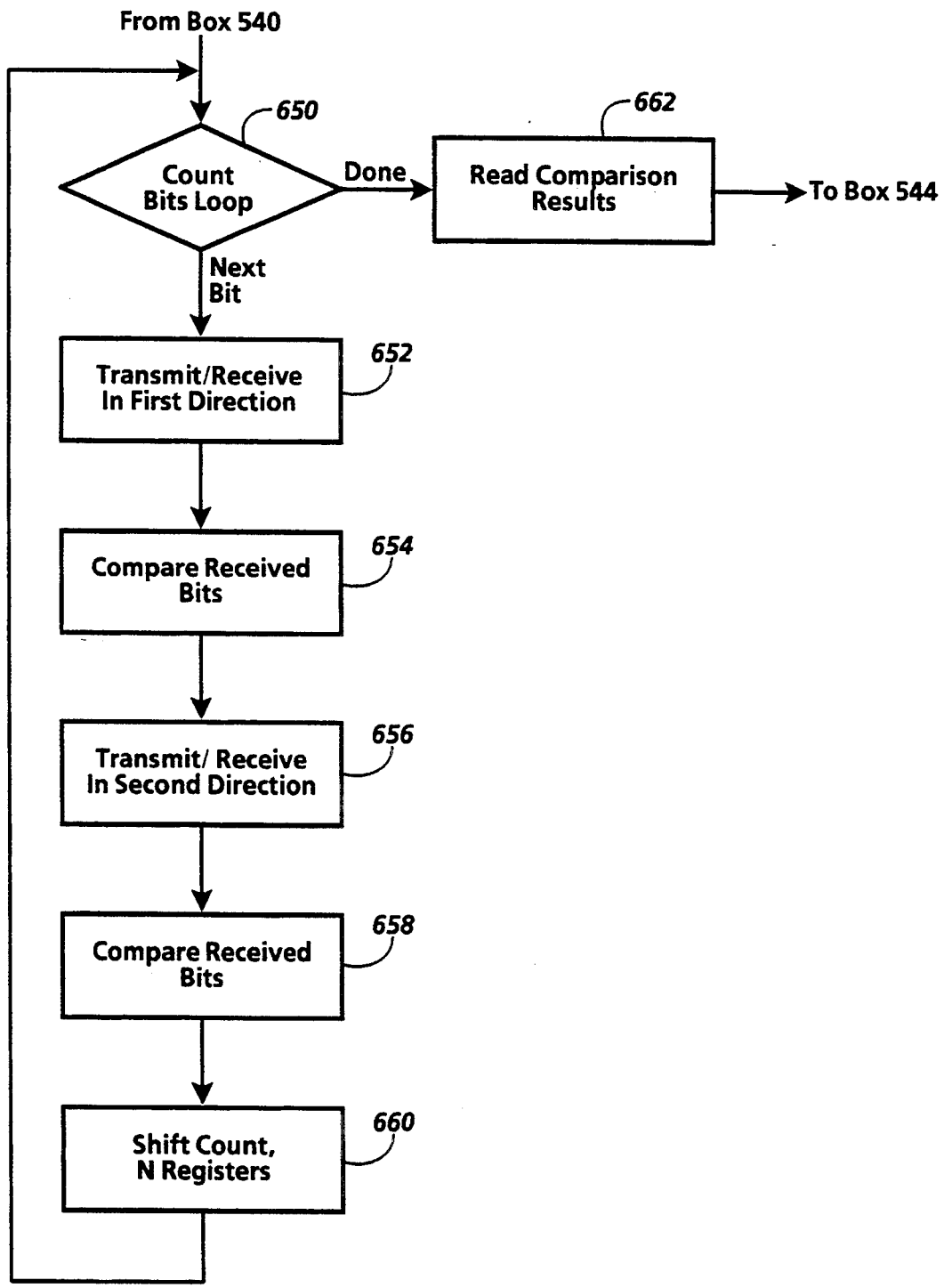
FIG. 17 is a flow chart showing steps in operating the components of FIG. 16 to perform operations in FIG. 15.
Figure 18:
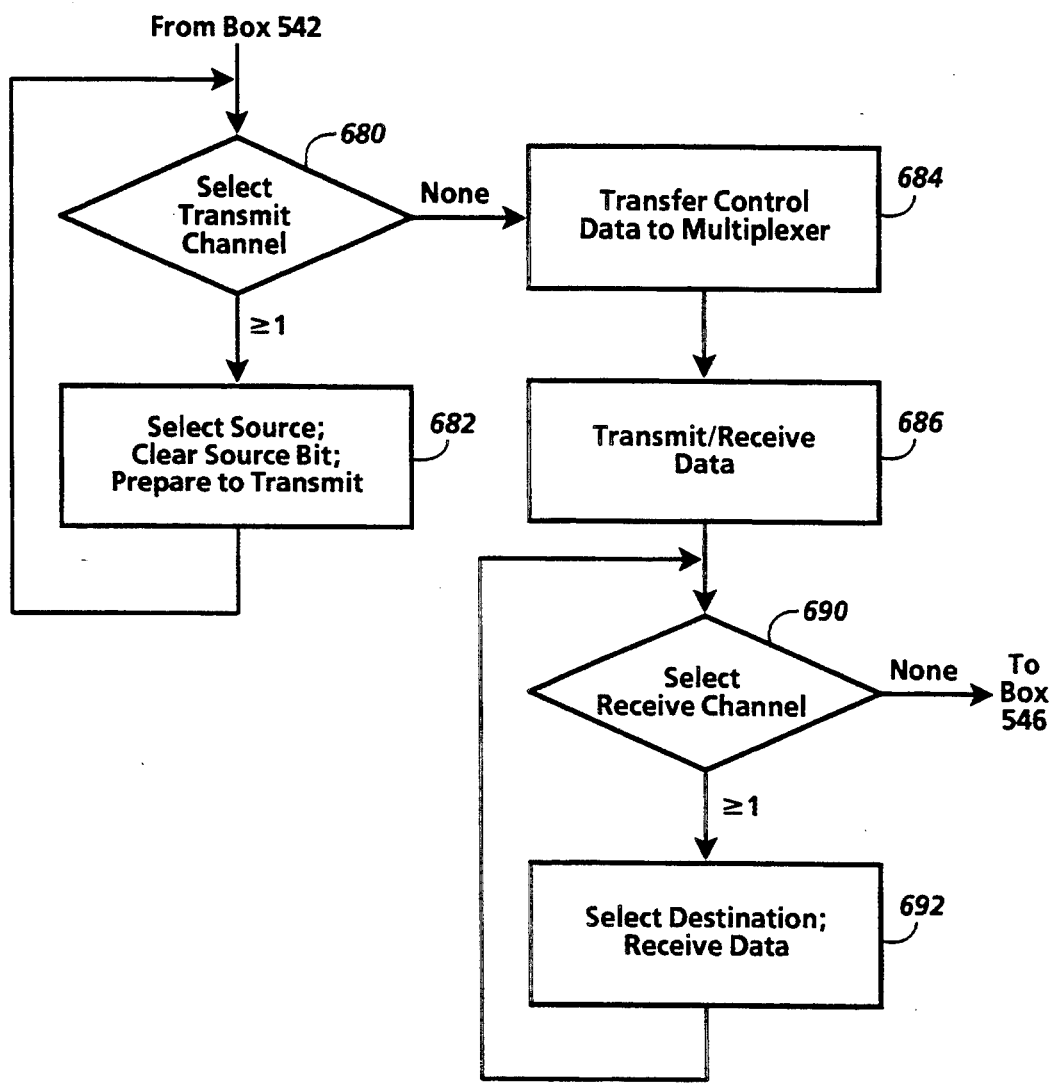
FIG. 18 is a flow chart showing steps in transferring data in FIG. 15.

FIG. 15 shows steps that use a threshold criterion and a necessity criterion to determine whether to balance and that use an easy criterion for completion of balancing. FIG. 16 shows components that can decide whether to perform balancing for a substrate's channels. FIG. 17 shows in greater detail how the decision step in FIG. 15 can be performed by the components in FIG. 16. FIG. 18 shows in greater detail how the transfer step in FIG. 15 can be performed.

The steps in FIG. 15 implement the steps in boxes 382, 384, and 390 in FIG. 11. The step in box 530 is performed when the step in box 380 in FIG. 11 determines that enough invalid processing units are available to fork a variable.

The step in box 530 operates the count logic on each substrate to obtain a count of its valid processing units, using the count and store count commands described above. The step in box 532 then performs a hierarchical sum operation as described above so that controller 186 can provide data to host system 182 indicating the total number of valid processing units on the substrates.

In the step in box 540, host system 152 branches based on whether the hierarchical sum obtained in box 5:32 does not exceed a threshold. This threshold can, for example, be a proportion P. For optimal results, P can be set empirically, but P=0.1 is expected to yield satisfactory balancing during the initial increase of the number of valid processing units. After that, a lower value or a zero value of P may be satisfactory, because the valid processing units should be distributed relatively evenly across the substrates. Rather than a threshold number of valid processing units, the step in box 540 could apply a different threshold, such as a threshold difference between the maximum number of valid processing units on a substrate and the average number of valid processing units on a substrate, with a difference above the threshold indicating that balancing should be done to avoid a serious imbalance.

If the hierarchical sum does not exceed P, the step in box 542 operates the circuitry on each substrate to transmit a count to its connected substrates and to use the substrate's count and the counts received from connected substrates to decide whether a transfer should be made between the substrate and each of its connected substrates. The count can be the count of valid processing units from box 530. The step in box 542 can decide whether to transfer by producing transfer control data for the substrate indicating, for each channel, whether the substrate should transmit, receive, or neither transmit nor receive. The step in box 544 performs any transfers that result from the decisions in box 542, in response to the transfer control data.

The step in box 546 applies the simple criterion of whether any transfers were made in box 544 to determine whether balancing is completed. This step can be done by performing a hierarchical OR operation on a bit that indicates whether each valid processing unit was the source of a transfer, as described above in relation to FIG. 6. If at least one processing unit was the source of a transfer, the step in box 548 kills the processing units that were sources and then operates the count logic on each substrate to obtain an updated count before returning to the step in box 542 for further balancing.

When no transfers were performed, she step in box 550 operates the count logic on each substrate to obtain counts of invalid processing units and of processing units that require forking for the variable being forked, with one of the counts being temporarily stored in each substrate's count register while the other is obtained. A compare counts command can then be provided so that the two counts are compared to obtain, for each substrate, a bit indicating whether the number of forking processing units is greater than the number of invalid processing units. The step in box 550 also performs a hierarchical OR operation on these bits to determine whether there are enough invalid processing units on each substrate. The step in box 552 branches on the result of this OR operation, performing the fork operation in box 392 if there are enough invalid processing units, and pruning in box 246 if not.

Even if the number of valid processing units exceeds the threshold, balancing may be necessary. To find out, the step in box 560 performs the same sequence of operations as in box 550. Then, the step in box 562 branches, performing forking in box 392 if there are enough invalid processing units. But if there are not enough processing units on any substrate, the step in box 542 is performed to begin balancing.

For more precise balancing, a series of operations resembling the step in box 542 could be performed on different counts. For example, a first operation could be performed on counts that are the sum of the number of forking processing units and the number of valid processing units on each substrate, to determine whether a balancing transfer should be made. Then, a second operation could be performed on counts of valid processing units to determine whether a balancing transfer can be made. Finally, a third operation could be performed on counts of forking processing units to decide whether to transfer a forking or a non-forking processing unit. In this way balancing could ensure that the number of valid processing units after a forking operation will be equal on all the substrates.

FIG. 16 shows components that can perform the step in box 542 in FIG. 15. Intersubstrate I/O pads 420, shown in FIG. 12, are connected to intersubstrate transfer multiplexing logic 600 which is in turn connected so that a bit from transmit bit register 602 can be transmitted on each serial channel and so that a bit from each serial channel can be loaded into a respective one of receive bit registers 604 through 606. The bits received from each serial channel are provided from the respective receive bit register to a respective one of transfer decision logic units 610 through 612. Each transfer decision logic unit is also connected to receive a stored count N from count register 442 and lo receive a stored constant from N register 614 when AND gate 61(5 is enabled by the N signal. N register 614 can be data stored in hardwired form or in some form of permanent memory.

FIG. 16 also shows how each transfer decision logic unit 610 through 612 can be implemented. Adders 620 and 622 are both connected to receive N from N register 614, but adder 620 is connected to receive count data from count register 442 while adder 622 is connected to receive count data from the respective one of transfer decision logic units 610 through 612. Each adder responds to an adder clock signal by providing at its output the sum of three values—its two input bits and a carry bit based on the previous add cycle.

Each output bit from adder 620 is XORed by XOR gate 624 with a respective count bit from the respective one of transfer decision logic units 610 through 612, and the result of the XOR function is provided on an enable line to A store 626. If the XOR function is ON, A store 626 stores the value from the respective one of transfer decision logic units 610 through 612 in response to a bit clock signal. If the XOR function is OFF, A store 626 continues to store its previously stored value.

Similarly, each output bit from adder 622 is XORed by XOR gate 630 with a respective count bit from count register 442, and the result of the XOR function is provided on an enable line to B store 632. If the XOR function is ON, B store 632 stores the value from count register 442 in response to the bit clock signal. If the XOR function is OFF, B store 632 continues to store its previously stored value. The values from A store 626 and B store 632 are provided to control signal logic 320.

FIG. 17 shows steps in box 542 in FIG. 15 that transmit and compare count data and obtain transfer control data from comparison results. The step in box 650 begins an iterative loop that repeats for the number of bits in the counts being transmitted and compared. This iterative loop can be controlled by host system 182.

For each bit, the step in box 652 operates the circuitry on each substrate to transmit and receive one bit in a first direction on each serial channel connecting substrates. This step can be performed in response to a command of the form:

FirstTransferOpCode.

Control signal logic 320 on each substrate can respond to the first transfer command by providing signals on the clock line of transmit bit register 602 to load the output bit from count register 442. Control signal logic 320 then provides signals on the transmit/receive line of multiplexing logic 600 so that a bit is be transmitted from transmit register 602 onto each channel that transmits in the first direction and so that a bit can be received in the respective one of receive bit registers 604 through 606 from each channel that receives in the first direction. Then, control signal logic 320 provides signals on the clock lines of receive bit registers 604 through 606 to load the received bits.

The step in box 654 operates the circuitry on each substrate to compare the bits received in the step in box 652. This step can be performed in response to a command of the form:

FirstCompareOpCode(N+), where N+ is a boolean value indicating whether the comparison takes into account the value from N register 614, indicating the number N of serial channels. If N+ indicates that the comparison takes N into account, control signal logic 320 on each substrate can respond to the first compare command by providing signals on the N line to enable AND gate 616 to provide a bit from N register 614. Whatever N+ indicates, control signal logic 320 provides signals on the adder clock line of the respective one of transfer decision logic units 610 through 612 for each serial channel on which a bit was received, then provides signals on the bit signal line so that the values from XOR gates 624 and 630 control A store 626 and B store 632.

The steps in boxes 656 and 658 are the same as those in boxes 652 and 654, respectively, except, that different signals are provided to multiplexing logic 600 so that data is transmitted in the second direction on each serial channel and the other ones of transfer decision logic units 610 through 612 are operated. These steps can be performed in response to commands of the forms:

SecondTransferOpCode; and
SecondCompareOpCode(N+).

After transmitting and comparing in both directions, the step in box 660 provides signals on the shift lines of count register 442 and N register 614 so that each is shifted to provide its next bit. This step can be performed in response to a command of the form:

ShiftCompareOpCode.

When all the count bits have been handled in this manner, the step in box 662 reads the results from A store 626 and B store 630. This step can be performed in response to a command of the form:

ReadCompareOpCode.

In response to the read compare command, control signal logic 320 can store the values from A store 626 and B store 630 for subsequent use. For example, the step in box 542 can take N into account, so that the resulting values in A store 626 and B store 630 indicate whether this substrate's count and the count of the respective connected substrate differ by more than N. If so, the step in box 544 can provide signals to multiplexing logic 600 and other components to transfer a processing unit's data from the substrate with the larger count to the substrate with the smaller count, but only for channels that are not disabled by disable data 92 in FIG. 3. The step in box 544 can be performed in response to an appropriate command.

In other cases, values can be compared without taking N into account. This may be appropriate in comparing counts of forking processing units, for example, to determine whether to transfer a forking or non-forking processing unit.

Rather than being performed in response to a series of commands as described above, the steps in FIG. 17 could alternatively be performed in response to a single command. This would be possible if each substrate included circuitry that could perform the iterative loop for the correct number of iterations.

It would also be possible to perform the comparison in box 654 on one substrate, then transmit the result of the comparison back to the other substrate. This approach would avoid the additional steps in boxes 656 and 658.

FIG. 18 shows steps that can be performed in box 544 in FIG. 15 in transferring data from processing units between substrates. The steps in FIG. 18 include a first iterative loop that is performed in preparing to transmit and a second iterative loop that is performed in handling data received.

The step in box 680 begins the transmit loop by branching on the result of an operation that selects the next transmitting channel. This step can employ find-first-one logic that receives one bit for each of the substrate's channels, which can be implemented using the daisy chain techniques described in the column processing application. The find-first-one logic produces an OR bit indicating whether any channel's bit is ON and also produces a bit for each channel. If at least one channel's bit is ON, the respective bit of one and only one of the channels is ON. If the find-first-one logic's OR bit indicates that a channel's bit is ON, the respective bits of the channels can be used to select a transmit/receive register to be loaded, as shown in FIG. 2A, or to select an I/O pad to which a line of a permutation network is to be connected, as shown in FIG. 2B.

The step in box 682 then selects one of the valid processing units on the substrate as a source for the transfer of data. This selection can be made by operating processing unit selection logic as described in the column processing application. In the step in box 544, the selection can be made from all of the valid processing units. The selection could also be made from the forking or non-forking processing units if a decision had been made to transfer a forking or non-forking processing unit. When a processing unit is selected, its source bit is cleared as shown in FIG. 6 so that it can be killed after the transfer is completed. The step in box 682 can also load a transmit/receive register or perform other operations necessary before transmitting data from the selected processing unit.

The steps in boxes 680 and 682 can be performed in response to a command of the form:

TransmitPrepareOpCode, with each substrate's control signal logic 320 responding by selecting channels until the find-first-one logic's OR bit indicates that none of the channels have an ON bit. The result from the find-first-one logic's OR bit can be provided to a hierarchical OR operation so that host system 182 can determine whether all substrates have completed this step.

The step in box 684 then provides transfer control data to multiplexing logic 600, which can include one bit for each channel, indicating transmit if it is ON. This step can be performed in response to a command of the form:

TransferControlOpCode, with each substrate's control signal logic 320 responding by providing the transfer control data.

The step in box 686 then performs the transfer of data. This step can be performed in the manner described in more detail in the column processing application, using transmit/receive registers. For example, this step can be performed in response to a command of the form:

TransferDataOpCode, in response to which each substrate's control signal logic 320 can provide signals to multiplexing logic 300 and to the transmit/receive registers so that data is transmitted in the appropriate direction on each serial channel.

When transfer is completed, the step in box 690 begins the receive loop by branching on the result of an operation of the find-first-one logic to select the next receiving channel. The step in box 692 then selects one of the invalid processing units on the substrate as a destination for the transfer of data. This selection can be made by operating processing unit selection logic as described in the column processing application. When a processing unit is selected, the step in box 692 can also load the selected processing unit from a transmit/receive register or perform other necessary operations to receive the data.

The steps in boxes 690 and 692 can be performed in response to a command of the form:

ReceiveCompleteOpCode, with each substrate's control signal logic 320 responding by selecting channels until the find-first-one logic's OR bit indicates that none of the channels have an ON bit. As above, the result from the find-first-one logic's OR bit can be provided to a hierarchical OR operation so that host system 182 can determine whether all substrates have completed this step.

If a permutation network were used rather than transmit/receive registers, the selection operations in boxes 690 and 692 would precede the step in box 686, and could also precede the step in box 684.

5. Pruning Operations

Figure 19:
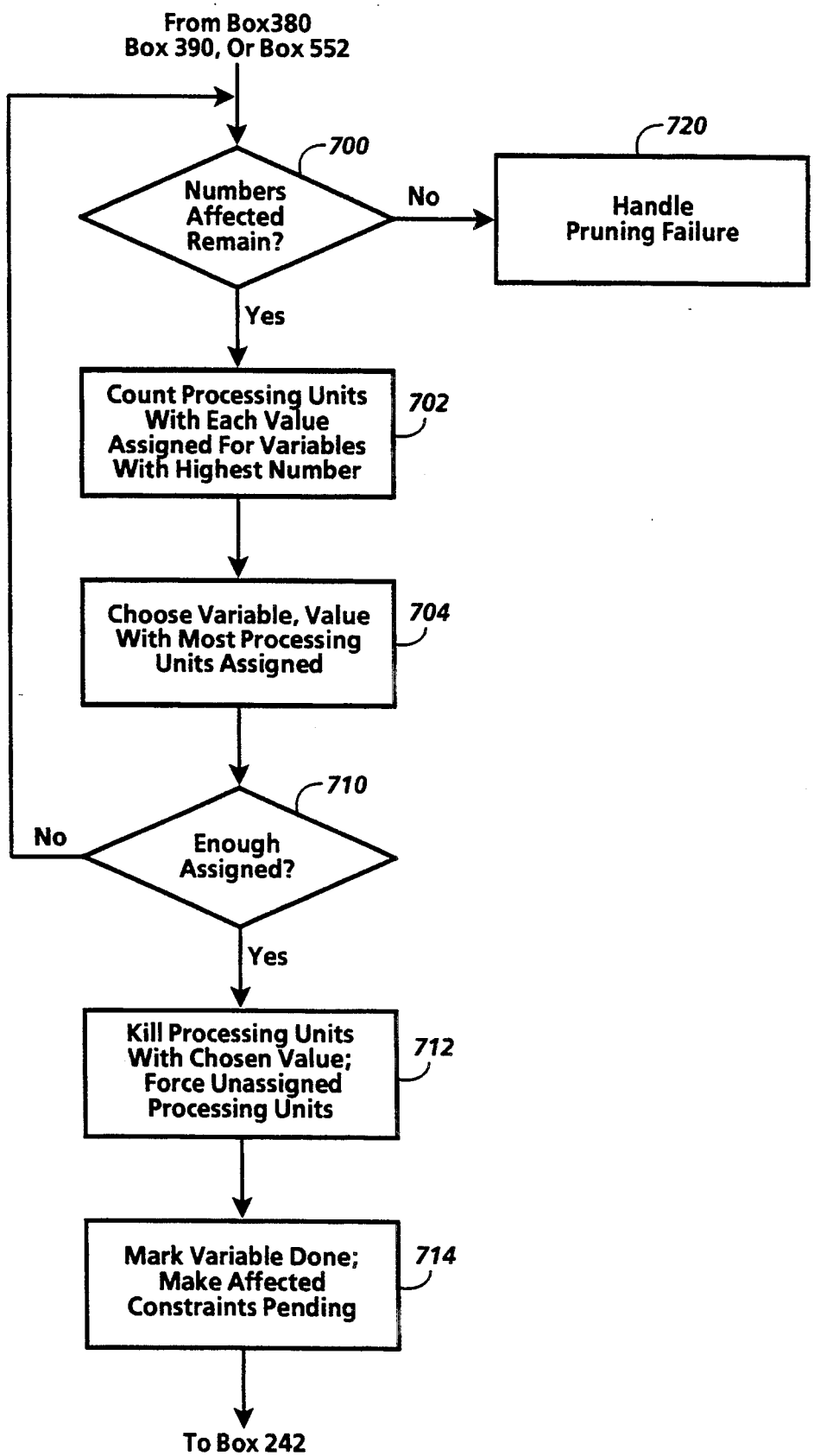
FIG. 19 is a flow chart showing steps in pruning in FIG. 9.

The pruning step in box 246 in FIG. 9 can be implemented with the circuitry described above. FIG. 19 shows steps in pruning that can be performed when the step in box 380 in FIG. 11 determines that there are not enough invalid processing units in the processor to fork a variable or when the step in box 390 or the step in box 552 in FIG. 15 determines that there are not enough invalid processing units on a substrate to fork.

The step in box 700 begins an iterative loop that goes through the variables from those with the highest number of affected constraints downward. The step in box 702 counts the number of processing units with each value assigned for each of the variables that have the highest number of affected constraints being handled. This step can be performed with hierarchical sum commands as described above.

The step in box 704 then chooses the variable with one of its values assigned in the highest number of processing units. The step in box 710 determines whether the number assigned for the chosen variable is greater than a threshold number. The threshold number can be determined by experiment and should be high enough to reduce time spent pruning.

If the chosen variable has been assigned one of its values in enough processing units, the step in box 712 kills those processing units that have that value assigned and forces any processing units that have not yet assigned the chosen variable a value to its other value, both of which can be done using calculate commands. The step in box 714 then marks the variable done and makes all affected constraints pending before returning to the step in box 242 in FIG. 9.

If none of the variables meets the threshold number, the step in box 720 handles the failure to find a variable for pruning in an appropriate way. One way to handle a pruning failure would be to lower the threshold and then repeat the steps in FIG. 19. The threshold could be lowered until pruning is finally successful.

The steps in FIG. 19 could be simplified by initially trying the variable chosen in box 376 in FIG. 11 as the variable to be pruned. Then a step similar to the step in box 704 could choose the value for the variable that has the most processing units assigned. Only if none of the processing units have either value assigned would the iterative loop beginning with box 700 be performed to find another variable to be pruned.

Host system 182 stores data indicating each variable that has been pruned and the value that was pruned. Subsequently, the step in box 272 in FIG. 9 can include using the data about pruned variables to identify the remaining combinations of values to be considered in restarting with the step in box 232. Because each variable can be pruned for only one of its values, only one restarting combination must be considered for each pruned variable. The variables can be handled in a sequence, with each variable's respective restarting combination including the unpruned values of previously handled variables. The sequence of variables can be chosen based on efficiency.

6. Results Obtaining Operations

Figure 20:
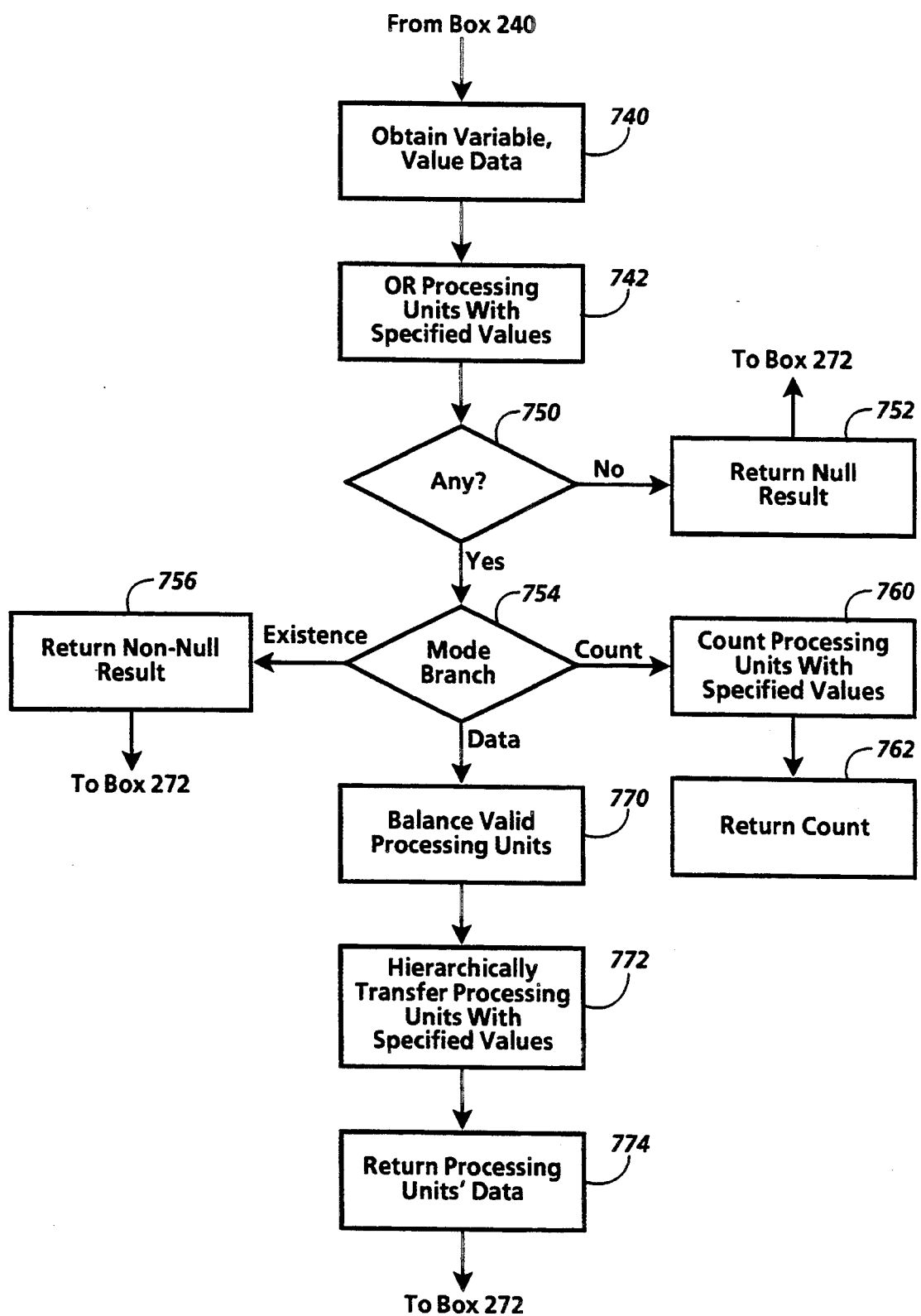
FIG. 20 is a flow chart showing steps in obtaining results in FIG. 9.
Figure 21:
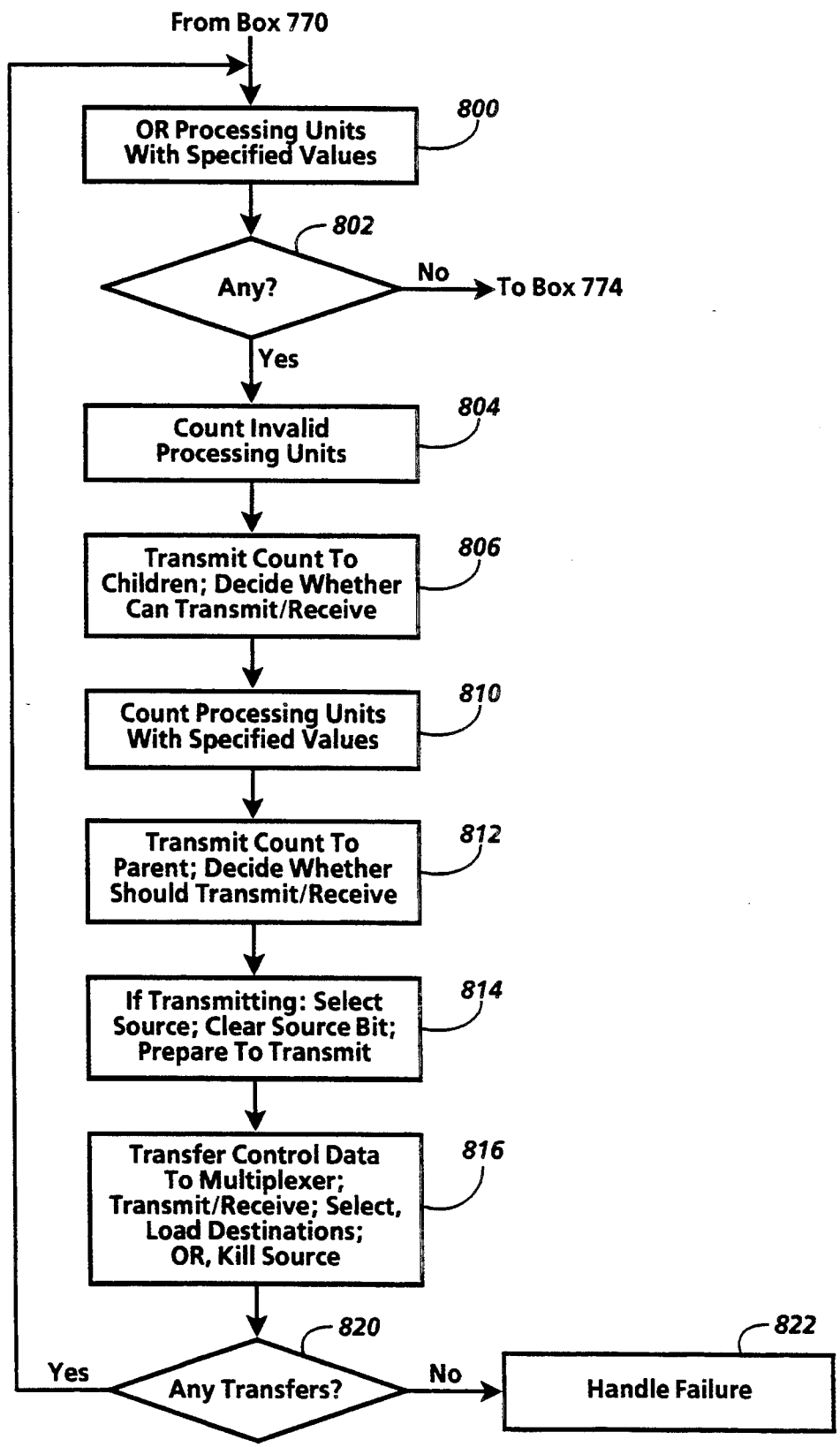
FIG. 21 is a flow chart showing steps in hierarchically transferring data in FIG. 20.

The step of obtaining results in box 270 in FIG. 9 can also be performed with the circuitry described above. Various techniques could be used. The steps in FIG. 20 illustrate three different modes of obtaining results, all of which begin with similar steps. One mode simply determines whether or not any processing units have a specified combination of values or any of its subcombinations. The second mode counts processing units that have a specified combination of values or any of its subcombinations. The third mode transfers the data of processing units having a specified combination of values or any of its subcombinations hierarchically from substrate to substrate until the data reaches controller 186 and can be provided to host system 182. FIG. 21 shows steps in performing the third mode in greater detail.

The step in box 740 in FIG. 20 begins by obtaining data indicating the variables and values that specify a combination of values to be used in obtaining results. Host system 182 can obtain this data in accordance with the value assignment search being performed. The step in box 742 provides calculate commands, select commands, and hierarchical OR commands so that the parallel processor operates to provide an OR signal indicating whether any of the processing units have the specified combination of values from box 740 or any of its subcombinations.

The step in box 750 then branches based on the OR signal from box 742. If none of the processing units have the specified combination or any of its subcombinations, the step in box 752 returns a null result before continuing with the step in box 272 in FIG. 9. But if at least one of the processing units has the specified combination or a subcombination, the step in box 754 branches according to the mode of obtaining results.

In the first mode, the results merely indicate the existence of processing units with the specified combination or a subcombination. Therefore, the step in box 756 provides a non-null result before continuing with the step in box 272 in FIG. 9.

In the second mode, the results indicate a count of processing units with the specified combination or a subcombination. Therefore, the step in box 760 performs a hierarchical count operation to obtain a count of those processing units and the step in box 762 returns the count before continuing with the step in box 272 in FIG. 9.

In the third mode, the results are the data of processing units with the specified combination or a subcombination. Therefore, the step in box 770 performs a balancing operation as described above in order to equalize the number of valid processing units on the substrates. This balancing operation can include steps like those in boxes 542, 544, 546, and 548 in FIG. 15, and could take N into account to ensure that each transfer attempted can in fact be successfully performed. The step in box 770 can also include steps that count the number of invalid processing units to ensure that there are enough invalid processing units on each substrate to provide a path for hierarchical transfer of data.

The hierarchical transfer of data in box 772 is performed when the balancing in box 770 fails to result in any transfers. In box 772, the data of each processing unit with the specified combination or a subcombination is transferred through the hierarchy of substrates to controller 186, which can return the data of the processing units to host system 182 in the step in box 774. Alternatively, controller 186 could provide each processing unit's data to host system 182 when received.

The step in box 772 can be implemented as shown in FIG. 21. The step in box 800 provides calculate commands, select commands, and hierarchical OR commands, as in box 742, so that the step in box 802 can branch on whether there are any remaining processing units whose data should be transferred.

If there are processing units whose data should be transferred, the step in box 804 counts the number of invalid processing units on each substrate. The step in box 806 then transmits the invalid count, stored in count register 442 in FIG. 16, to each of the substrate's children in the hierarchy. The step in box 806 also decides whether the substrate can receive from its children and can transmit to its parents. This decision can be made with the transfer decision logic units as shown in FIG. 16, if an AND gate is added to control whether the bits from count, register 442 are provided to each transfer decision logic unit.

The transfer decision logic unit for the serial channel to any of the substrate's respective children can be operated to compare the count from box 804 with N. Adder 622 can add N bits from N register 614 to OFF bits from the respective receive bit register. XOR gate 630 can receive bits from count register 442 and from adder 622 and the result can control B store 632. If B store 632 has an ON value when the comparison is done, then there are more than enough invalid processing units to receive one processing unit's data from each of the substrate's children in the hierarchy.

The transfer decision logic unit for the serial channel to the substrate's respective parent can be operated to compare the count received from the parent with N. Adder 620 can receive N bits from N register 614 and add them to OFF bits from the additional AND gate mentioned above. XOR gate 624 can receive bits from the respective receive bit register and from adder 620 and the result can control A store 626. If A store 626 has an ON value when the comparison is done, then the parent has enough invalid processing units to receive one processing unit's data from each of its children, so that this substrate can transmit to its parent.

The step in box 810 then counts the number of processing units on each substrate that have the specified combination or a subcombination. The step in box 812 then transfers the count to the substrate's parent in the hierarchy. The step in box 814 also decides whether the substrate should transmit to its parent and receive from its children. As above, this decision can be made with the transfer decision logic units of FIG. 16 with an additional AND gate as described above.

The transfer decision logic unit for the serial channel to the substrate's respective parent can be operated to compare the count from box 810 with zero. XOR gate 630 can receive bits from count register 442 and OFF bits from adder 622 and the result can control B store 632. If B store 632 has an ON value when the comparison is done, then the substrate has a processing unit that should be transmitted.

The transfer decision logic unit for the serial channel to each of the substrate's respective children can be operated to compare the count received from the child with zero. XOR gate 624 can receive bits from the respective receive bit register and OFF bits from adder 620 and the result can control A store 626. If A store 626 has an ON value when the comparison is done, then the child has a processing unit that should be transmitted, so this substrate should receive from the child.

If the substrate is transmitting, meaning that the results from boxes 806 and 812 indicate that it can and should transmit, the step in box 814 selects one of the processing unit that has the specified combination or a subcombination as the source. The source's source bit is cleared and its data is loaded into a transmit/receive register or other preparations are made for transmitting.

The step in box 816 provides control data based on the results from boxes 806 and 812 to multiplexing logic 600. Then data is transmitted and received. For each processing unit's data that is received, an invalid processing unit is selected as the destination and is loaded with the data. A hierarchical OR operation on the source bits can determine whether any processing units were transferred, after which the processing units that were sources are killed. If no processing units were transferred, the step in box 820 branches to handle the hierarchical transfer failure in box 822.

If processing units were transferred, the step in box 800 is repeated, and the steps in FIG. 21 continue until no processing units remain with the specified combination or a subcombination. Then, the step in box 774 in FIG. 20 can be performed.

Alternatively, data could be transferred to controller 186 through a bus connected to each substrate, but this would require additional circuitry to control such transfers.

7. Configuration Operation

Configuration of the substrates could be performed in a number of ways. To minimize configuration time when coprocessor 184 is being used, all necessary data for startup could be stored in ROM on each substrate. But this would seriously limit the flexibility of interconnection between substrates, and would cause problems in case one substrate malfunctions. Therefore, the implementation described below stores relatively little data on each substrate prior to initialization, but makes use of circuitry described above to obtain configuration data.

Figure 22:
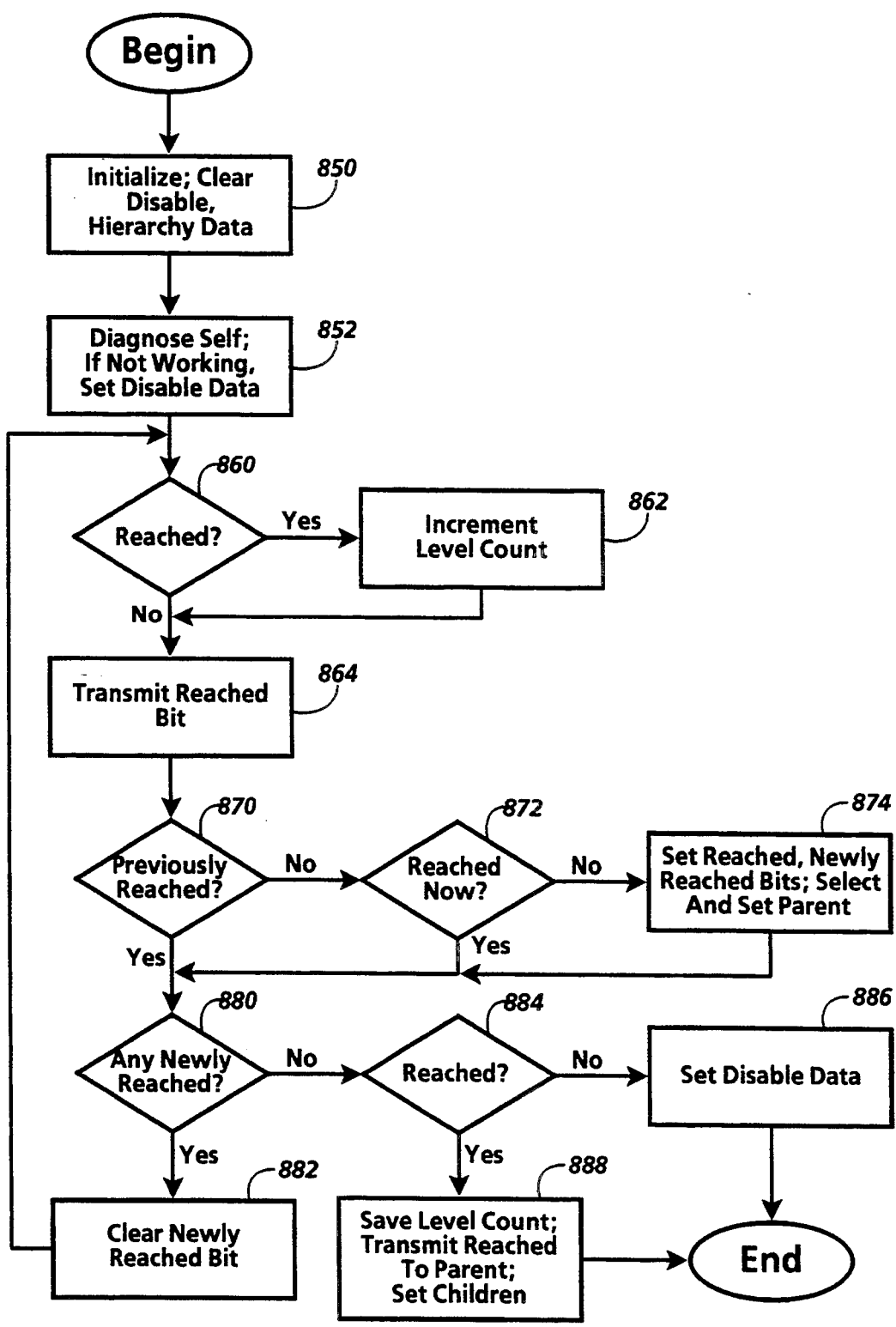
FIG. 22 is a flow chart showing steps in configuring a processor including substrates like that of FIG. 10.

FIG. 22 shows steps that perform configuration. The steps in FIG. 22 begin after any necessary initialization of host system 182 and central controller 186 has been completed. At this point, the substrates are arbitrarily interconnected but do not have disable data 92 or hierarchy data 94. Therefore, the data transfer operations described above cannot be performed to the extent that they rely on disable data 92 or hierarchy data 94.

The step in box 850 begins by initializing the circuitry on each substrate. This includes clearing all memory, except permanently stored memory such as N register 614. Disable data 92 is cleared so that it indicates that none of the serial channels are disabled. Hierarchy data 94 is cleared so that it indicates that none of the channels connect to parent substrates or to children substrates in the hierarchy, that the substrate is at level zero in the hierarchy, and that the substrate has not yet been reached or is newly reached in creating the hierarchy. The level can be stored in a level counter that is simply cleared by this step.

The step in box 852 then performs steps by which each substrate diagnoses its own operability. If it is not working, the substrate attempts to set its disable data to indicate that all channels are disabled. The step in box 852 can also include diagnostic operations to find non-working channels between substrates, and a non-working channel could be disabled by setting disable data 92 for the channel in each connected substrate, preventing further use of the channel for any purpose. For example, the substrates connected to a channel can exchange signals to diagnose each other and their connection, setting disable data 92 for the channel if the exchange of signals does not indicate a working connected substrate and channel. The remaining steps in FIG. 22 are not performed by any substrate that is disabled, and data received from a disabled channel is ignored by the receiving substrate.

Hierarchy data 94, as implied above, can include a bit to indicate whether the substrate has been reached in configuring the hierarchy and another bit to indicate whether the substrate is newly reached, meaning that it has been reached by the latest iteration of the loop in FIG. 22. The step in box 860 begins the iterative loop by testing the reached bit on each substrate. If the substrate has been reached, its level counter is incremented in the step in box 862.

The step in box 864 transmits the reached bit to all the connected substrates. Therefore, after this step, each substrate will have a bit from each of its working connected substrates indicating whether that substrate has previously been reached.

The step in box 870 branches based on whether a substrate had been reached before receiving the bits from box 864. This can be determined from the reached bit. The step in box 872 similarly branches based on whether a substrate has now been reached, which can be determined from the bits received from box 864. If a substrate had not been previously reached and if it has now been reached, the step in box 874 sets its reached bit and its newly reached bit. In addition, since more than one of the bits received from box 864 may be ON, the step in box 874 selects one of the connected substrates that provided an ON bit, which can be done using the find-first-one logic described above. The step in box 874 also modifies the hierarchy data to make the selected connected substrate the parent of this substrate.

The step in box 880 performs a hierarchical OR operation with the part of the hierarchy that has been established thus far, to determine whether any substrates are newly reached. If so, the step in box 882 clears the newly reached bits of all the substrates before continuing with another iteration.

When no substrates are newly reached, the hierarchy is complete. The step in box 884 branches for each substrate based on whether it has been reached. If not, the step in box 886 sets its disable data, because a substrate that is not in the hierarchy probably has bad connections to other substrates and therefore should not be used for value assignment search. Each substrate that has been reached saves the count in its level counter in the step in box 888, for subsequent use in hierarchical sum operations. In addition, each reached substrate transmits its reached bit to its parent, so that each parent substrate can set its hierarchy data to indicate which of its connected substrates are its children.

Further steps could be taken to provide data to host system 182 indicating the number of levels in the hierarchy, for use in performing hierarchical sum operations. Also, a hierarchical sum operation could be performed to count the total number of processing units on working substrates, for use in managing the search space.

Hierarchy data 94 could also be obtained by first finding the interconnection topology and then using it to find an optimal hierarchical connection. The interconnection topology could be found by starting at the initial substrate, the root node of the hierarchy, and transferring a focus bit in a depth-first or breadth-first scan until all substrates are visited by the focus bit. If a substrate attempts to transfer the focus bit to a substrate that has already been visited, through an external connection that is not connected to another substrate, through a non-working channel, or to a non-working substrate, the focus bit is not echoed, and operations are performed to retain the focus bit on the substrate that attempted to transfer it. If the focus bit is successfully transferred, the substrate that receives it keeps it, and the transmitting substrate deletes it.

The focus bit technique could be extended to provide a unique identifier for each substrate that, is not disabled. The controller could keep a count that is incremented each time the focus bit is successfully transferred. The count could be provided to the substrate with the focus bit, to serve as its unique identifier.

Other configuration techniques could be used if, for example, each substrate had a unique identifier and if controller 186 were connected to provide data to each substrate using its unique identifier. But the steps in FIG. 22 allow configuration of a large number of identical substrates that are only connected to a few other substrates.

E. Miscellaneous

The invention has been described in relation to an implementation in which transfer decision logic and other logic on each substrate include separate components. These components could alternatively be implemented as an additional processing unit on each substrate, programmed to perform balancing, initialization, hierarchical intersubstrate transfer, and other operations in response to commands from a central controller. The additional processing unit could have a register file, an ALU, and connections to state bits analogous to a microcontroller. This alternative might mean less logic on each substrate, but might be slower in operation.

The following copending, coassigned U.S. patent applications are incorporated herein by reference: Ser. No. 07/205,125, now issued as U.S. Pat. No. 5,088,048 entitled "Massively Parallel Assumption-Based Truth Maintenance," filed Jun. 10, 1988; Ser. No. 07/260,205, entitled "Disjunctive Unification," filed Oct. 19, 1988; and Ser. No. 07/628,916, now issued as U.S. Pat. No. 5,325,500, entitled "Parallel Processing Units on a Substrate, Each Including a Column of Memory."

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A method of operating a processor to perform a value assignment search for two or more variables, each variable having a respective set of possible values, the value assignment search seeking combinations of values of the variables that are consistent with a set of constraints, each combination of values including at most one of the respective possible values of each of the variables; the processor including:

first and second substrates;

respective external connecting circuitry on each of the first and second substrates, the respective external connecting circuitry of the first and second substrates being connected to each other; and respective parallel processing circuitry on each of the first and second substrates; the respective parallel processing circuitry of each substrate comprising:

a respective set of two or more processing units; each processing unit comprising respective memory for storing respective data and respective processing circuitry connected for accessing the respective memory; the respective processing circuitry being for performing operations on data such that the respective processing circuitry of the processing units can perform operations on data in parallel; and respective external transfer circuitry for transferring data between any of the respective set of processing units and the respective external connecting circuitry for transfer to the other of the first and second substrates;

the method comprising steps of:

storing respective data in the respective memory of each of a first subset of processing units on the first substrate and in the respective memory of each of a second subset of processing units on the second substrate; the respective data of the each processing unit in the first and second subsets indicating a respective combination of possible values of the variables; each respective combination including at most one of the respective possible values of each of the variables;

operating the respective parallel processing circuitry of each of the substrates to perform value assignment search operations; the step of operating the parallel processing circuitry comprising substeps of:

operating the respective processing circuitry of each of the first and second subsets of processing units to perform a first value assignment search operation on the respective data of each processing unit; the first value assignment search operation determining, for each processing unit, whether the respective combination of values indicated by the respective data is consistent with a constraint; and operating the respective parallel processing circuitry of each of the first and second substrates to perform a second value assignment search operation that modifies the first and second subsets of processing units so that the first subset of processing units includes a first processing unit on the first substrate and the processing units on the second substrate include a second processing unit that is not in the second subset of processing units;

operating the respective external transfer circuitry of the first substrate and the second substrate to transfer the respective data of the first processing unit to the respective memory of the second processing unit on the second substrate through the respective external connecting circuitry of the first and second substrates, so that the first processing unit is removed from the first subset of processing units and the second processing unit is added to the second subset of processing units.

2. The method of claim 1 in which the respective external transfer circuitry of each of the first and second substrates comprises respective transfer decision logic for determining whether to transfer the respective data of any of the substrate's respective set of processing units to the respective external connecting circuitry for transfer to the other of the first and second substrates; the step of operating the respective external transfer circuitry to transfer the respective data comprising a substep of operating the respective transfer decision logic of each of the first and second substrates to determine to transfer the respective data of one of the first substrate's processing units to the first substrate's respective external connecting circuitry for transfer to the second substrate.

3. The method of claim 2 in which the respective parallel processing circuitry of each of the first and second substrates further comprises respective processing unit selection logic for selecting any of the respective set of processing units; the step of operating the respective external transfer circuitry to transfer the respective data further comprising a substep of operating the first substrate's respective processing unit selection logic to select the first processing unit after the substep of operating the respective transfer decision logic; the step of operating the respective external transfer circuitry to transfer the respective data further comprising a substep of operating the second substrate's respective processing unit selection logic to select the second processing unit after the substep of operating the respective transfer decision logic.

4. The method of claim 2 in which the respective external transfer circuitry of each of the first and second substrates further comprises respective count logic for obtaining count data indicating a number of processing units on the substrate; the substep of operating the respective transfer decision logic comprising substeps of:

operating the first substrate's respective count logic to obtain first subset count data indicating a number of processing units in the first subset and operating the second substrate's respective count logic to obtain second subset count data indicating a number of processing units in the second subset;

operating the respective external transfer circuitry of each of the first and second substrates to transmit the first subset count data to the second substrate and to transmit the second subset count data to the first substrate; and operating the respective transfer decision logic of each of the first and second substrates to use the first subset count data and the second subset count data in determining whether to transfer the respective data of any of the substrate's respective set of processing units.

5. The method of claim 4 in which the substep of operating the respective external transfer circuitry to transmit the first subset count data and the second subset count data comprises substeps of:

providing a first count transfer command to control the respective external transfer circuitry of the first substrate to transmit the first subset count data and to cause the respective external transfer circuitry of the second substrate to receive the first subset count data; and providing a second count transfer command to control the respective external transfer circuitry of the second substrate to transmit the second subset count data and to cause the respective external transfer circuitry of the first substrate to receive the second subset count data.

6. The method of claim 4 in which the substep of operating the respective transfer decision logic to use the first subset count data and the second subset count data comprises substeps of:

comparing the numbers indicated by the first subset count data and the second subset count data to determine which of the first and second subsets includes more processing units; and using the first subset count data and the second subset count data to determine whether the respective data of a processing unit can be successfully transferred from the one of the first and second subsets that includes more processing units to the other.

7. A method of operating a processor to perform a value assignment search for two or more variables, each variable having a respective set of possible values, the value assignment search seeking combinations of values of the variables that are consistent with a set of constraints, each combination of values including at most one of the respective possible values of each of the variables; the processing including:

two or more substrates;

respective external connecting circuitry on each of the substrates, the respective external connecting circuitry of each substrate being connected to the respective external connecting circuitry of each of a respective set of connected substrates; and respective parallel processing circuitry on each of the substrates; the respective parallel processing circuitry of each substrate comprising:

a respective set of processing units; each processing unit comprising respective memory for storing respective data and respective processing circuitry connected for accessing the respective memory; the respective processing circuitry being for performing operations on data such that the respective processing circuitry of the processing units can perform operations on data in parallel; and respective external transfer circuitry for transferring data between any of the respective set of processing units and the respective external connecting circuitry for transfer to the other of the first and second substrates;

the method comprising steps of:

for each substrate, storing respective data in the respective memory of each of a respective set of valid processing units on the substrate; the respective data of each valid processing unit indicating a respective combination of possible values of the variables that could be consistent with the set of constraints;

operating the parallel processing circuitry of each substrate to perform a sequence of processing substeps; each processing substep including a substep of performing an operation that modifies the respective set of valid processing units of at least one of the substrates in accordance with the set of constraints; and operating the external transfer circuitry of each substrate to perform a sequence of balancing substeps during the sequence of processing substeps; each balancing substep comprising substeps of:

determining whether to transfer the respective data of any of the substrate's respective set of valid processing units to the respective external connecting circuitry for transfer to one of the substrate's connected substrates; and if the determining substep determines to transfer, transferring the respective data of a source one of the substrate's respective set of valid processing units through the respective external connecting circuitry to a destination one of the processing units on one of the substrate's connected substrates, the destination processing unit not being in the connected substrate's respective set of valid processing units so that the source processing unit is removed from the respective set of valid processing units and the destination processing unit is added to the respective set of valid processing units.

8. The method of claim 7 in which the determining substep comprises a substep of determining whether it is necessary to transfer the respective data of one of the substrate's respective set of valid processing units.

9. The method of claim 7 in which the determining substep comprises a substep of operating the respective external transfer circuitry of all the substrates together to determine whether a sum of the respective sets of valid processing units is so small that the respective sets of valid processing units on the substrates should be approximately equal to avoid a serious imbalance.

10. The method of claim 7 in which at least one of the substeps of performing an operation that modifies the respective set of valid processing units comprises substeps of:

applying one of the set of constraints to find a processing unit whose respective data indicates a combination of values that is inconsistent with the set of constraints; and removing the processing unit whose respective data indicates an inconsistent combination of values from the respective set of valid processing units.

11. The method of claim 7 in which the respective data of a first one of the processing units that is in the respective set of valid processing units of one of the substrates indicates a first combination of values in which a first one of the variables is not assigned a value; at least one of the substeps of performing an operation that modifies the respective set of valid processing units comprising substeps of:

copying the respective data of the first processing unit to a second one of the processing units that is not in the respective set of valid processing units of the substrate so that the second processing unit is added to the respective set of valid processing units; and modifying the respective data of at least one of the first and second processing units after the copying step so that the first variable is assigned different values in the first and second processing units and so that the respective data of the first and second processing units indicate different subcombinations of the first combination of values.

* * * * *